United States Patent
Oka et al.

[11] Patent Number: 6,064,524
[45] Date of Patent: May 16, 2000

[54] OPTICAL FUNCTIONAL MATERIALS AND PROCESS FOR PRODUCING THE SAME

[75] Inventors: Motohiro Oka; Mitsuru Tsuchiya; Norinaga Nakamura; Kiyotaka Takematus; Yurie Ota; Hiroko Suzuki; Natsuko Yamashita; Hiroomi Katagiri, all of Tokyo-To, Japan

[73] Assignee: Dai Nippon Printing Co., Ltd., Japan

[21] Appl. No.: 09/277,752

[22] Filed: Mar. 29, 1999

Related U.S. Application Data

[62] Division of application No. 08/388,257, Feb. 13, 1995, Pat. No. 5,909,314.

[30] Foreign Application Priority Data

| Feb. 15, 1994 | [JP] | Japan | ................................. 6-42022 |
| Apr. 14, 1994 | [JP] | Japan | ................................. 6-100582 |
| Apr. 14, 1994 | [JP] | Japan | ................................. 6-100583 |
| Feb. 6, 1995 | [JP] | Japan | ................................. 7-41238 |

[51] Int. Cl.$^7$ ........................................... G02B 1/10
[52] U.S. Cl. .................. 359/582; 359/580; 359/599; 359/586
[58] Field of Search .................. 359/599, 601, 359/580, 582, 586, 581; 427/503, 515, 163.1, 167

[56] References Cited

U.S. PATENT DOCUMENTS

| 4,188,451 | 2/1980 | Humphrey, Jr. | ......................... 428/331 |
| 4,207,357 | 6/1980 | Goossens | ................................. 427/162 |

(List continued on next page.)

FOREIGN PATENT DOCUMENTS

| 0 203 730 A3 | 12/1986 | European Pat. Off. | ........... G02B 1/10 |
| 0 476 510 A1 | 3/1992 | European Pat. Off. | ........ C03C 17/42 |

(List continued on next page.)

OTHER PUBLICATIONS

Patent Abstracts of Japan, vol. 011, No. 283 (P–615), Sep. 12, 1987 & JP–A–62 080603 (Toray Industries Inc), Apr. 14, 1987.

(List continued on next page.)

*Primary Examiner*—Cassandra Spryrou
*Assistant Examiner*—John Juba, Jr.
*Attorney, Agent, or Firm*—Parkhurst & Wendel, L.L.P.

[57] ABSTRACT

A antiglare layer 12 having a fine uneven surface is formed directly or through other layer(s) on a transparent substrate film 11, and a layer 13 having a low refractive index, which is lower than the refractive index of the antiglare layer 12, is formed thereon. The refractive index of the antiglare layer 12 is higher than the refractive index of a layer in contact with said antiglare layer 12 on its surface remote from the layer 13 having a low refractive index. An $SiO_x$ film may be used as the layer 13 having a low refractive index. The $SiO_x$ film per se has excellent gas barrier property and antifouling property as an optical functional membrane and is an optical functional material characterized by having excellent moistureproofness, scratch resistance, adhesion to a substrate, transparency, low refractive index, dye, deterioration preventive property, and other properties. A layer 13 having a low refractive index as a surface layer is formed through other layer(s) on a transparent substrate film 11, and at least one of the other layer(s) is a hard coat layer 12 of 0.5 $\mu$m or more in thickness, having a high refractive index, composed mainly of a resin. The hard coat layer 12 having a high refractive index is in direct contact with a layer 13 having a low refractive index. The refractive index of the hard coat layer 12 having a high refractive index is higher than the refractive index of a layer in contact with the hard coat layer 12 having a high refractive index on its surface remote from the layer 13 having a low refractive index. For use, the antireflection film is laminated to a polarizing plate or a liquid crystal display device.

19 Claims, 12 Drawing Sheets

U.S. PATENT DOCUMENTS

| | | | |
|---|---|---|---|
| 4,551,361 | 11/1985 | Burzynski et al. | 359/581 |
| 4,687,707 | 8/1987 | Matsuo et al. | 428/336 |
| 4,765,729 | 8/1988 | Taniguchi | 359/580 |
| 5,028,566 | 7/1991 | Lagenddijk | 437/238 |
| 5,314,724 | 5/1994 | Tsukune et al. | 427/489 |
| 5,394,269 | 2/1995 | Takamatsu et al. | 359/580 |
| 5,413,865 | 5/1995 | Nakamura et al. | 428/432 |
| 5,415,927 | 5/1995 | Hirayama et al. | 428/307.3 |
| 5,424,130 | 6/1995 | Nakanishi et al. | 428/410 |
| 5,484,749 | 1/1996 | Maeda et al. | 437/238 |
| 5,489,328 | 2/1996 | Ono et al. | 106/2 |
| 5,561,021 | 10/1996 | Yamazaki et al. | 430/130 |
| 5,627,426 | 5/1997 | Whitman et al. | 359/599 |
| 5,742,118 | 4/1998 | Endo et al. | 359/601 |
| 5,759,643 | 6/1998 | Miyashita et al. | 428/1 |

FOREIGN PATENT DOCUMENTS

| | | | |
|---|---|---|---|
| 0 513 727 A3 | 11/1992 | European Pat. Off. | C03C 17/30 |
| 0 519 784 A1 | 12/1992 | European Pat. Off. | G02B 1/10 |
| 0 656 258 A2 | 6/1995 | European Pat. Off. | B32B 33/00 |
| 41 17 257 A1 | 12/1992 | Germany | G02B 1/10 |
| 62-148902 | 7/1987 | Japan | G02B 1/10 |
| 4-258675 | 9/1992 | Japan | C09D 5/00 |

OTHER PUBLICATIONS

Database WPI, Section Ch. Week 9302, Derwent Publications Ltd., London, GB; Class A26, AN 93–012393 XP002016176 & JP–A–04 338 901 (Toray Industries Inc.), Nov. 26, 1992.

Patent Abstracts of Japan vol. 013, No. 244 (M–834), Jun. 7, 1989 & JP 01 051932 A (Dai Nippon Printing Co. Ltd.), Feb. 28, 1989, *abstract; figure*.

Patent Abstracts of Japan vol. 014, No. 406 (C–0754), Sep. 4, 1990 & JP 02 153844 A (Toyota Motor Corp), Jun. 13, 1990, *abstract; figure*.

IBM Technical Disclosure Bulletin, vol. 27, No. 1B, Jun. 1984, New York, U.S., p. 768 XP002037561 Anonymous: "Antiglare Technique for Plasma Displays" *the whole document* p. 768.

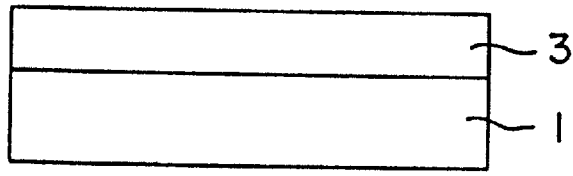
F I G. 1
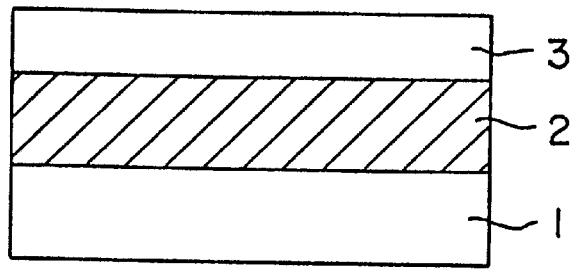
F I G. 2
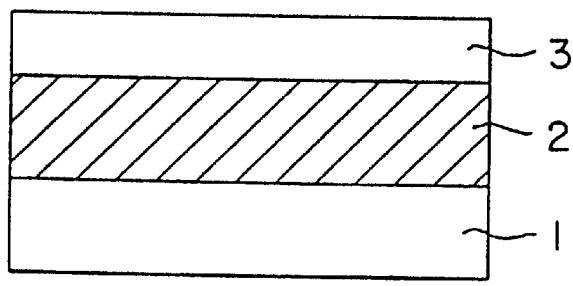
F I G. 3
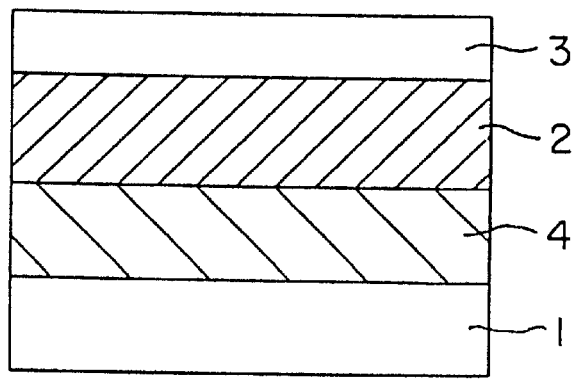
F I G. 4

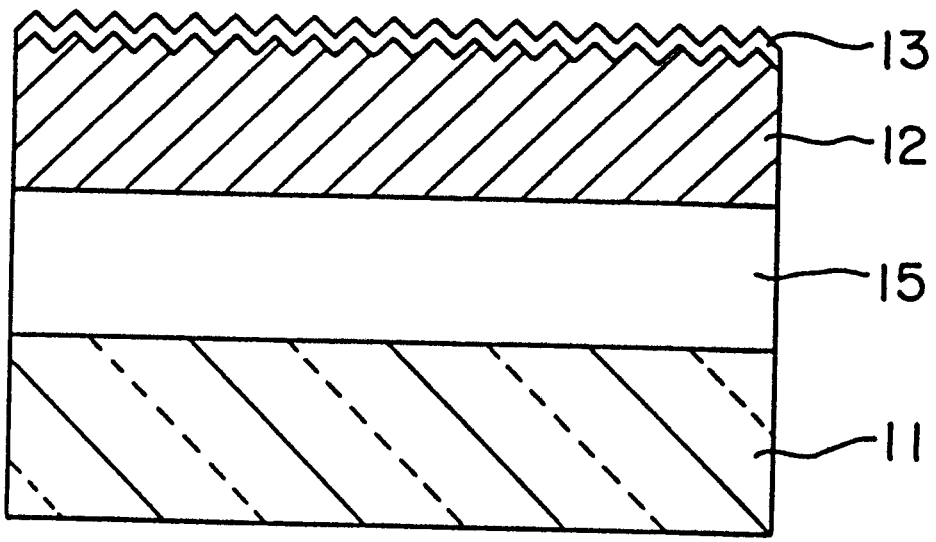
F I G. 14 A
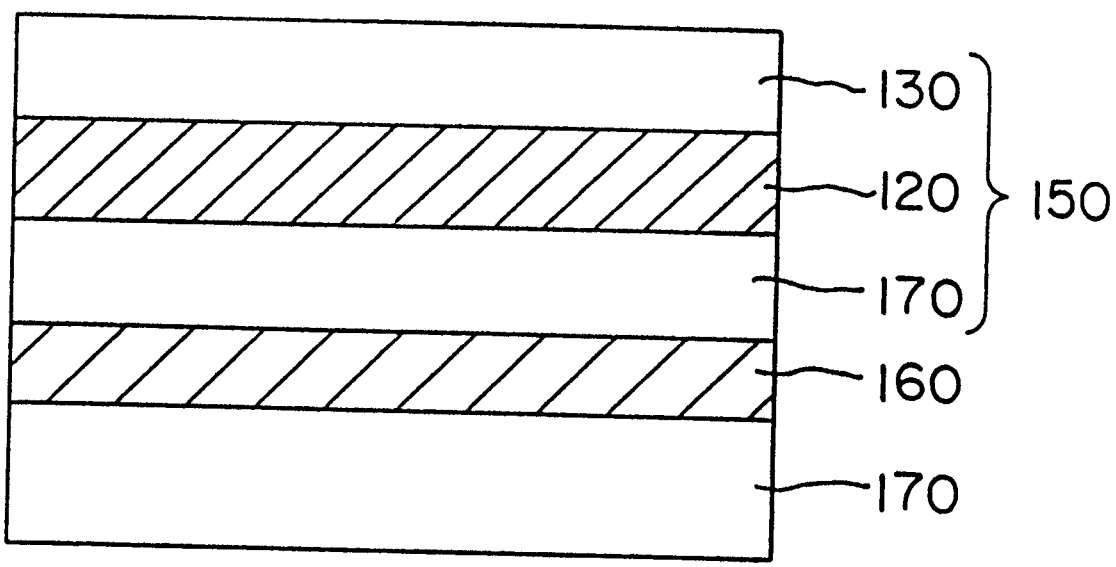
F I G. 14 B

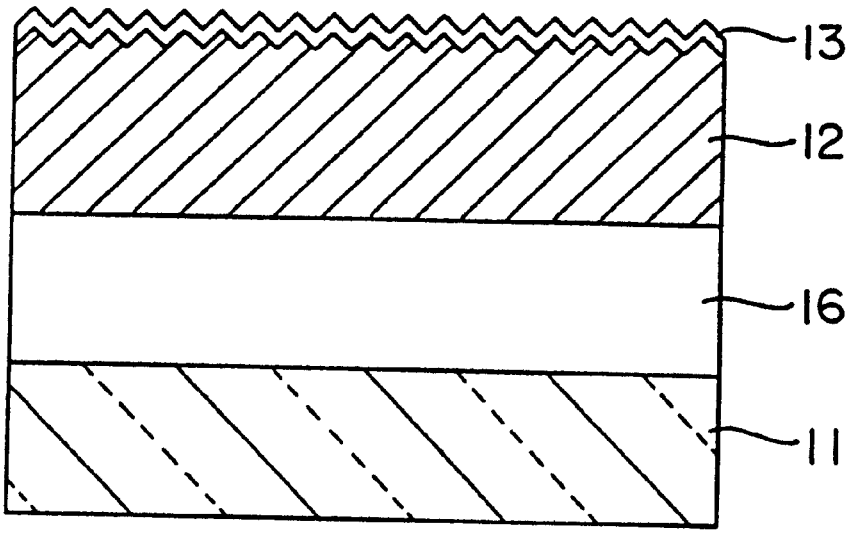
F I G. 15 A
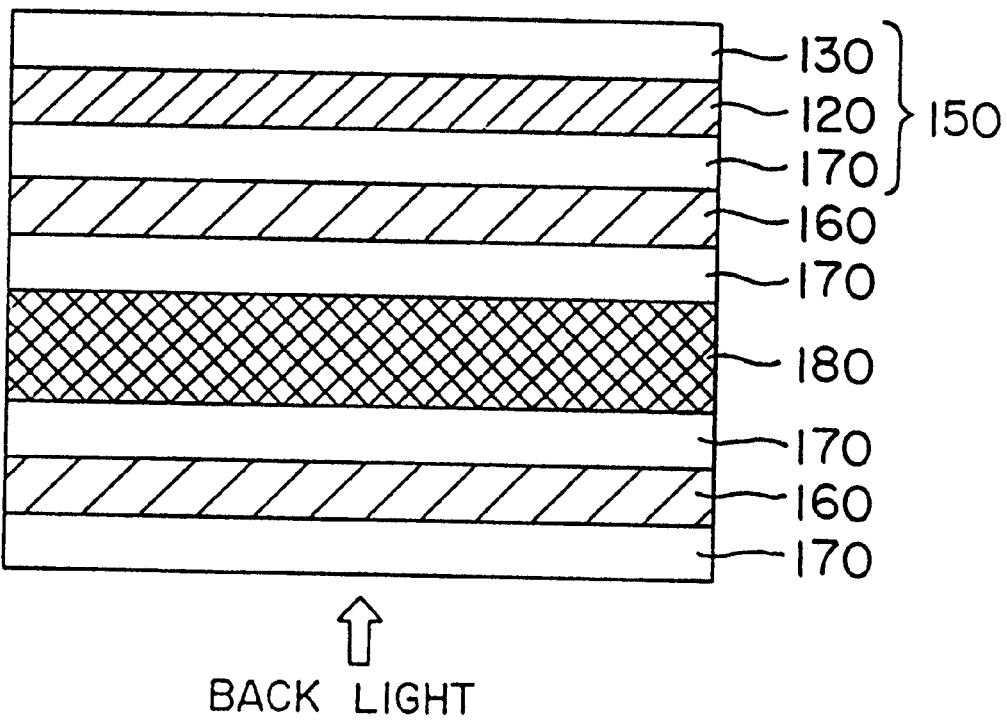
BACK LIGHT
F I G. 15 B

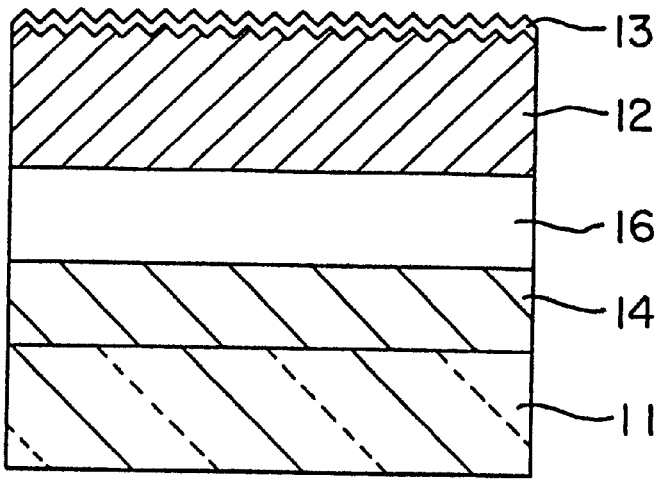
F I G. 16
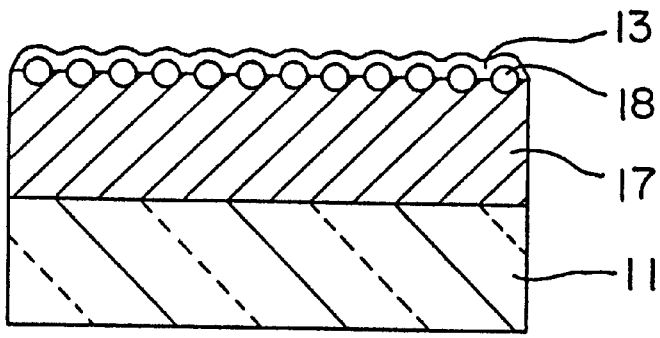
F I G. 17
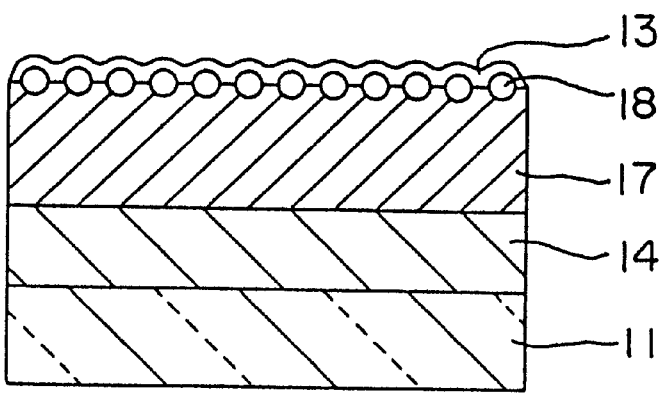
F I G. 18

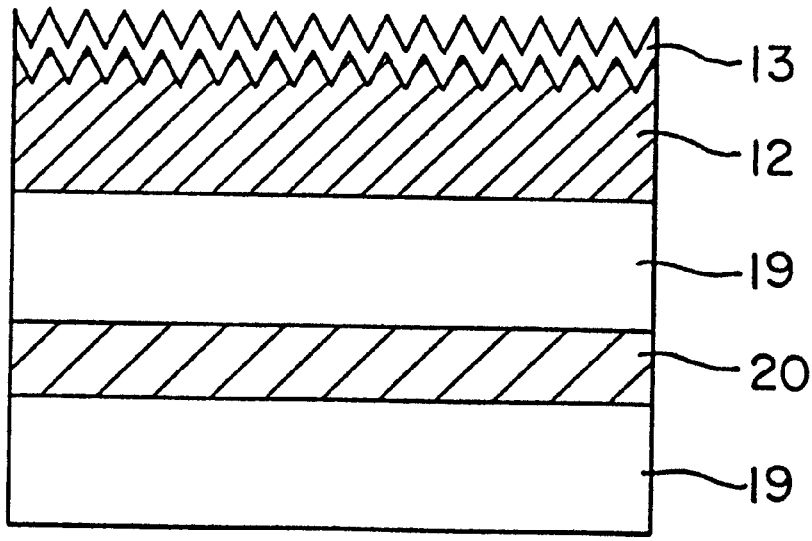
F I G. 19
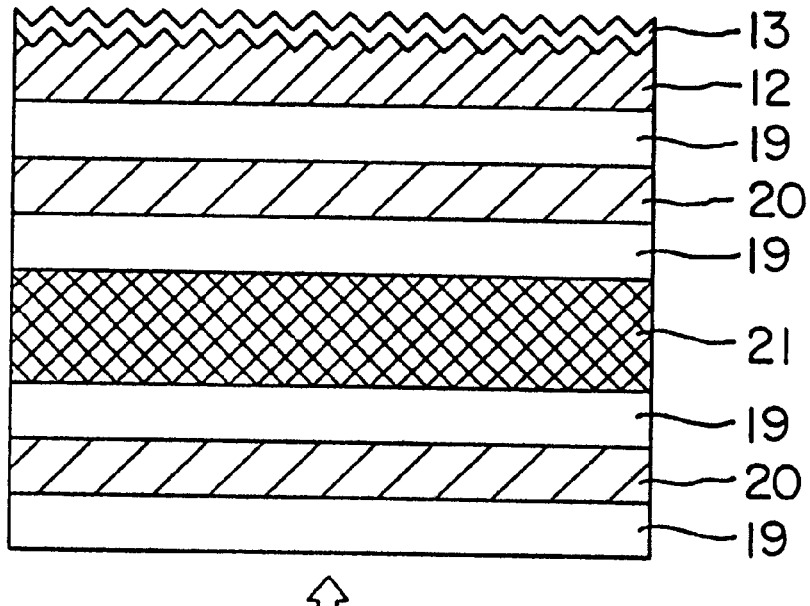
BACK LIGHT
F I G. 20

OPTICAL FUNCTIONAL MATERIALS AND PROCESS FOR PRODUCING THE SAME

This is a Division of application Ser. No. 08/388,257 filed Feb. 13, 1995 now U.S. Pat. No. 5,909,314.

BACKGROUND OF THE INVENTION

The present invention relates to an optical functional film and more particularly to an optical functional film suitable for use as an antireflection film in various displays of word processors, computers, and television, surfaces of polarizing plates used in liquid crystal displays, optical lenses, such as sunglass lenses of transparent plastics, lenses of eyeglasses, finder lenses for cameras, covers for various instruments, and surfaces of window glasses of automobiles and electric railcars, and a process for producing the same.

Transparent substrates, such as glasses and plastics, are used in curve mirrors, back mirrors, goggles, window glasses, displays of personal computers and word processors, and other various commercial displays. When visual information, such as objects, letters, and figures, is observed through these transparent substrates or, in the case of mirrors, when an image from a reflecting layer is observed through the transparent substrates, light reflects at the surface of the transparent substrates, making it difficult to see the visual information through the transparent substrates.

Conventional methods for antireflection of light include, for example, a method wherein an antireflection coating is coated on the surface of glass or plastics, a method wherein a very thin film of $MgF_2$ or the like having a thickness of about 0.1 μm or a metal deposited film is provided on the surface of a transparent substrate, such as glass, a method wherein an ionizing radiation curing resin is coated on the surface of plastics, such as plastic lenses, and a film of $SiO_2$ or $MgF_2$ is formed thereon by vapor deposition, and a method wherein a coating having a low refractive index is formed on a cured film of an ionizing radiation curing resin.

An about 0.1 μm thin film of $MgF_2$ formed on the above glass will now be described in more detail. It is already known that, when incident light perpendicularly enters a thin film, in order for the antireflection film to prevent the reflection of light by 100% and to pass light by 100% therethrough, relationships represented by the equations (1) and (2) should be met (see "Science Library" Physics=9 "Optics," pp.70–72, 1980, Science Sha Ltd., Japan).

$$n_o = \sqrt{n_g} \quad \text{Equation (1)}$$

$$n_o h = \lambda_o / 4 \quad \text{Equation (2)}$$

wherein $\lambda_o$ represents a particular wavelength, $n_o$ represents the refractive index of the antireflection film at this wavelength, h represents the thickness of the antireflection film, and $n_g$ represents the refractive index of the substrate.

It is already known that the refractive index $n_g$ of glass is about 1.5, the refractive index $n_o$ of an $MgF_2$ film is 1.38 and the wavelength $\lambda_o$ of incident light is 5500 Å (reference). When these values are substituted in the equation (2), the results of calculation show that the thickness h of the antireflection film is about 0.1 μm in terms of the optimal thickness.

From the equation (1), it is apparent that prevention of the reflection of light by 100% can be attained by the selection of such a material that the refractive index of the upper coating is approximately equal to a value of square root of the refractive index of the lower coating. The antireflection of light by utilizing the above principle, i.e., by making the refractive index of the upper coating slightly lower than the refractive index of the lower coating, has hitherto been carried out in the art.

Further, the surface of displays has hitherto been subjected to glare shielding treatment so that the reflection of light from the exterior or interior of displays could be diffused by the surface of the displays to shield glare. The glare shielding treatment has been carried out, for example, by a method wherein a resin containing a filler, such as silicon dioxide, is coated on the surface of a display, or a method wherein an antiglare substrate with a resin containing a filler, such as silicon dioxide, being coated thereon is applied onto the surface of a display.

In particular, a filmy polarizing element, which serves as an optical shutter, is provided on the surface of displays, such as liquid crystal displays. Since, however, the polarizing element per se has poor hardness, it is protected by a transparent protective substrate, such as glass, a transparent plastic sheet, or a transparent plastic film, to form a polarizing plate. However, the transparent protective substrate of a plastic, such as a transparent plastic sheet or a transparent plastic film, is also likely to be scratched. In order to solve this problem, in recent years, a polarizing plate with a hard property being imparted to the surface thereof has been developed. For example, Japanese Patent Laid-Open No. 105738/1989 describes such a technique.

This publication discloses a transparent protective substrate having excellent hardness and an antiglare property, that is, a triacetate film for light control, which is laminated to a polarizing element to constitute a polarizing plate. Since this triacetate film is formed by providing a cured coating of an ultraviolet curing epoxy acrylate resin on one surface of an unsaponified triacetate film, it has an excellent hard property.

In order to further impart an antiglare property to the above triacetate film having excellent hardness, a resin composition comprising the above ultraviolet curing epoxy acrylate resin and, added thereto, amorphous silica is coated on the surface of a triacetate film followed by curing. In laminating the coated triacetate film onto a polarizing element to form a polarizing plate, the coated triacetate film is first saponified with an alkali for the purpose of enhancing the adhesion to a polarizing element and, at the same time, antistatic purposes and then laminated to a polarizing element to form a polarizing plate.

However, it is noted that, when a layer for imparting a light antireflection property and, at the same time, an antiglare property is provided on a substrate film to form an antiglare-antireflection film, at least layers having these functions and other various layers, such as an adhesive layer, are provided, necessitating the provision of at least one layer, for example, between a substrate film and the outermost layer provided on the substrate film. In this case, the reflection of light occurs in the interface of layers, particularly in the interface of a layer having a relatively large thickness of not less than 0.5 μm such as formed by coating, i.e., a larger thickness than the wavelength of light, deteriorating the antireflection effect of the antireflection film.

On the other hand, for the conventional antireflection film with an antireflection layer being formed on the outermost surface of a transparent substrate film, since the thickness of the antireflection layer is as small as about 0.1 μm, the antireflection film has poor hardness and, at the same time, is likely to be scratched.

Further, for the film having an optical function, such as an antireflection film, optical functional membranes are usually laminated thereon. These optical functional membranes have an unsatisfactory gas barrier property and, hence, have a poor moistureproofness. In particular, a polarizing element used in a liquid crystal display has poor moistureproofness, and, therefore, moistureproofness should be imparted thereto.

Accordingly, the first object of the present invention is to provide, with respect to optical functional materials constituting optical materials, such as an antireflection film and an antireflection film, an optical functional film having excellent gas barrier properties, such as moistureproofness.

The second object of the present invention is to provide an antiglare-antireflection film having an antiglare property and/or an antireflection property and, at the same time, capable of reducing the reflection of light in the interface of layers in the interior of the film and a process for producing the same.

The third object of the present invention is to provide an antireflection film having a hard property in addition to properties involved in the second object and a process for producing the same.

DISCLOSURE OF THE INVENTION

In order to attain the first object, the optical functional film of the present invention comprises an $SiO_x$ film, wherein x is $1.50 \leq x \leq 4.00$, of which the surface has a contact angle with water of 40 to 180°. The $SiO_x$ film is preferably formed by the plasma CVD process. Further, in the present invention, the $SiO_x$ film preferably has a coefficient of dynamic friction of not more than 1.

The optical functional film may be typically prepared by forming an $SiO_x$ film, wherein x is $1.50 \leq x \leq 4.00$, directly or through other layer(s), on a transparent substrate film preferably by the plasma CVD process. It, however, can be formed on various optical articles at their desired positions.

In order to attain the second object, the antiglare-antireflection film of the present invention comprises: (1) a transparent substrate film and, provided on said transparent substrate film directly or through other layer(s), an antiglare layer, having a fine uneven surface, composed mainly of a binder resin, (2) a layer having a low refractive index, provided on said antiglare layer, which is lower than the refractive index of said antiglare layer, (3) the refractive index of said antiglare layer being higher than that of a layer (for example, a transparent substrate film, a primer layer, an adhesive layer, or a second hard coat layer) in contact with said antiglare layer on its surface remote from said layer having a low refractive index.

In order to attain the third object, the antiglare-antireflection film of the present invention comprises: (1) a transparent substrate film and, provided on said transparent substrate film directly or through other layer(s), an antiglare layer having a fine uneven surface and a hard property, (2) a layer having a low refractive index, provided on said antiglare layer, which is lower than the refractive index of said antiglare layer, (3) the refractive index of said antiglare layer being higher than that of a layer in contact with said antiglare layer on its surface remote from said layer having a low refractive index.

The process for producing an antiglare-antireflection film according to the present invention comprises the steps of: (1) coating a resin composition comprising a binder resin and fine particles having a high refractive index, which is higher than the refractive index of said binder resin, on a transparent substrate film directly or through other layer(s), the refractive index of said resin composition being higher than that of a layer in direct contact with the underside of a layer using said resin composition in a layer construction of an antiglare-antireflection film as a final product; (2) laminating a matte embossing film having a fine uneven surface onto the resultant coating so that the fine uneven surface faces the coating; (3) subjecting said laminate to heat treatment and/or irradiation with ionizing radiation to cure the coating; (4) peeling off said embossing film from said laminated having a cured coating to form an antiglare layer having a fine uneven surface; and (5) forming on said antiglare layer formed in said step (4) a layer having a low refractive index which is lower than the refractive index of said antiglare layer.

Another process for producing an antiglare-antireflection film according to the present invention comprises the steps of: (1) coating a resin composition comprising a binder resin and fine particles having a high refractive index, which is higher than the refractive index of said binder resin, on a matte embossing film having a fine uneven surface, the refractive index of said resin composition being higher than that of a layer in direct contact with the underside of a layer using said resin composition in a layer construction of an antiglare-antireflection film as a final-product; (2) laminating said embossing film having a coating formed in said step (1), directly or through other layer(s), onto a transparent substrate film so that said coating faces said transparent substrate film; (3) subjecting said laminate to heat treatment and/or irradiation with ionizing radiation to cure the coating; (4) peeling off said embossing film from said laminated having a cured coating to form an antiglare layer having a fine uneven surface; and (5) forming on said antiglare layer formed in said step (4) a layer having a low refractive index which is lower than the refractive index of said antiglare layer.

A further process for producing an antiglare-antireflection film according to the present invention comprises the steps of: (1) coating a resin composition comprising a binder resin and fine particles having a high refractive index, which is higher than the refractive index of said binder resin, on a matte embossing film having a fine uneven surface, the refractive index of said resin composition being higher than that of a layer in direct contact with the underside of a layer using said resin composition in a layer construction of an antiglare-antireflection film as a final product; (2) curing the resultant coating to form a hard coat layer having a high refractive index; (3) laminating said embossing film with a hard coat layer having a high refractive index being formed thereon in said step (2), through an adhesive layer, onto at least one surface of a transparent substrate film so that said hard coat layer having a high refractive index faces said transparent substrate film; (4) curing said adhesive layer and peeling off said embossing film from the laminate to transfer said hard coat layer having a fine uneven surface and a high refractive index to said transparent substrate film; and (5) forming on said hard coat layer having a high refractive index a layer having a low refractive index which is lower than the refractive index of said hard coat layer having a high refractive index.

The antireflection film according to a further aspect of the present invention comprises:

(1) a transparent substrate film and, provided through other layer(s) on at least one surface of said transparent substrate film, a layer having a low refractive index as a surface layer;

(2) at least one layer of said other layer(s) being a hard coat layer composed mainly of a binder resin, said hard coat layer being in direct contact with said layer having a low refractive index; and (3) the refractive index of said hard coat layer being higher than that of a layer in contact with said hard coat layer on its surface remote from said layer having a low refractive index.

The process for producing an antireflection film according to a further aspect of the present invention comprises the steps of:

(1) coating a resin composition comprising. a binder resin and fine particles having a high-refractive index, which is higher than the refractive index of said binder resin, on at least one surface of a transparent substrate film directly or through other layer(s), the refractive index of said resin composition being higher than that of a layer in direct contact with the underside of a layer using said resin composition in a layer construction of an antireflection film as a final product;

(2) curing the resultant coating to form a hard coat layer having a high refractive index; and (3) forming on said hard coat layer having a high refractive index a layer having a low refractive index which is lower than the refractive index of said hard coat layer having a high refractive index.

The process for producing an antireflection film according to a further aspect of the present invention comprises the steps of:

(1) coating a resin composition comprising a binder resin and fine particles having a high refractive index, which is higher than the refractive index of said binder resin, on a release film having a smooth surface, the refractive index of said resin composition being higher than that of a layer in direct contact with the underside of a layer using said resin composition in a layer construction of an antireflection film as a final product;

(2) laminating said release film with a coating being formed thereon in said step (1), directly or through other layer(s), onto at least one surface of a transparent substrate film so that said coating faces said transparent substrate film;

(3) subjecting said laminate to heat treatment and/or irradiation with ionizing radiation to cure the coating;

(4) peeling off said release film from said laminate having a cured coating to transfer said hard coat layer having a high refractive index to the side of said transparent substrate film; and (5) forming on said hard coat layer having a high refractive index a layer having a low refractive index which is lower than the refractive index of the refractive index of said hard coat layer having a high refractive index.

The process for producing an antireflection film according to a further aspect of the present invention comprises the steps of:

(1) coating a resin composition comprising a binder resin and fine particles having a high refractive index, which is higher than the refractive index of said binder resin, on a release film having a smooth surface, the refractive index of said resin composition being higher than that of a layer in direct contact with the underside of a layer using said resin composition in a layer construction of an antireflection film as a final product;

(2) curing said coating to form a hard coat layer having a high refractive index;

(3) laminating said release film with a hard coat layer having a high refractive index being formed thereon in said step (2), through an adhesive layer, onto at least one surface of a transparent substrate film so that said hard coat layer having a high refractive index faces said transparent substrate film;

(4) curing said adhesive layer and then peeling off said release film from said laminate to transfer said hard coat layer having a high refractive index to the side of said transparent substrate film; and (5) forming on said hard coat layer having a high refractive index a layer having a low refractive index which is lower than the refractive index of said hard coat layer having a high refractive index.

BRIEF DESCRIPTION OF THE DRAWINGS

FIG. 1 is a diagram showing a laminate film comprising a triacetyl cellulose film having a refractive index of 1.49 and formed thereon, a vapor-deposited $SiO_x$ film having a refractive index of 1.46;

FIG. 2 is a diagram showing a laminate film comprising a TAC substrate film having a refractive index of 1.49 and, formed thereof in the following order, a hard coat layer having a refractive index of 1.49 and a vapor-deposited $SiO_x$ film having a refractive index of 1.46;

FIG. 3 is a diagram showing a laminate film comprising a triacetyl cellulose film having a refractive index of 1.49 and, formed thereon in the following order, a hard coat layer having refractive index of 1.55 and a vapor-deposited deposited $SiO_x$ film having a refractive index of 1.46;

FIG. 4 is a diagram showing a laminate film comprising a saponified triacetyl cellulose film having a refractive index of 1.49 and, provided thereon in the following order, a primer layer having a refractive index of 1.55, a hard coat layer, having a refractive index of 1.65, comprising a resin with fine particles of ZnO having a high refractive index being dispersed therein, and a vapor-deposited $SiO_x$ film having a reactive index of 1.46;

FIG. 14A is a cross-sectional view showing a layer construction of an antiglare-antireflection film prepared in Example A3;

FIG. 14B is a cross-sectional view showing a layer construction of a polarizing plate with the antiglare-antireflection film of the present invention being laminated thereto;

FIG. 15A is cross-sectional view showing a layer construction of an antiglare-antireflection film prepared in Example A4;

FIG. 15B is a view showing a layer construction of a liquid crystal display using a polarizing plate with the antireflection film of the present invention being laminated thereto;

FIG. 16 a cross-sectional view showing a layer construction of an antiglare-antireflection film prepared in Example A5;

FIG. 17 is a cross-sectional view showing a layer construction of an antiglare-antireflection film prepared in Example A8;

FIG. 18 is a cross-sectional view showing a layer construction of an antiglare-antireflection film prepared in Example A9;

FIG. 19 is a diagram showing a layer construction of a polarizing plate with the antiglare-antireflection film of the present invention being laminated thereto;

FIG. 20 is a diagram showing a layer construction of a liquid crystal display using a polarizing plate with the antiglare-antireflection film of the present invention being laminated thereto;

BEST MODE FOR CARRYING OUT THE INVENTION

Constituent features of the present invention will now be described in more detail with reference to the following preferred embodiments.

Antiglare-antireflection Properties

The term "antiglare" used herein is intended to mean such a phenomenon that a fine uneven surface of an antiglare layer formed on the surface of a display or the like or a matte material disposed within the antiglare layer diffuses light from the exterior of the display or the like to cause diffuse reflection, reducing the projection of a fluorescent lamp or the like onto an image plane. The above antiglare layer has a drawback that light transmitted through a display is unfavorably diffused to lower the resolution and contrast.

Figure 21:
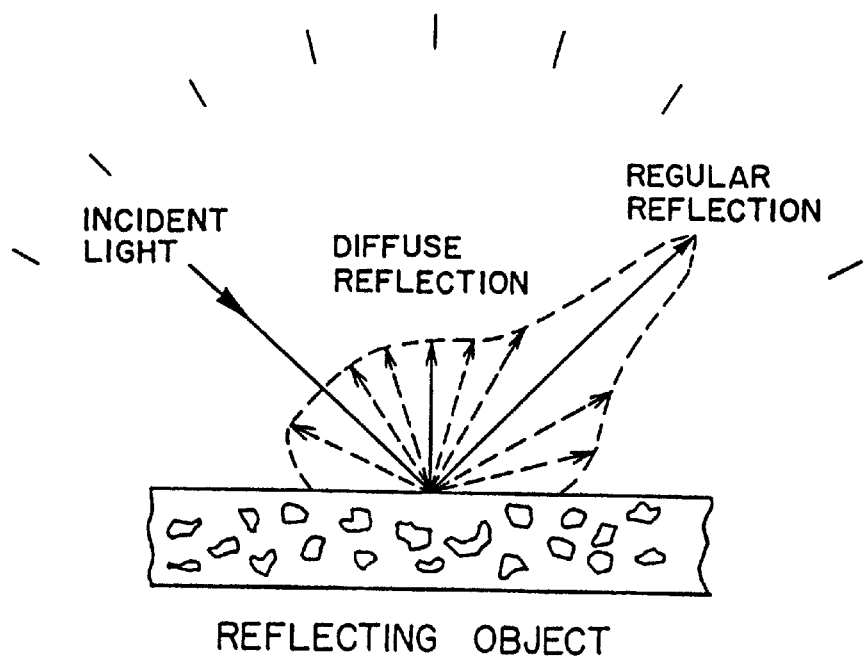
FIG. 21 is a conceptual diagram showing the reflection of light.
Figure 22:
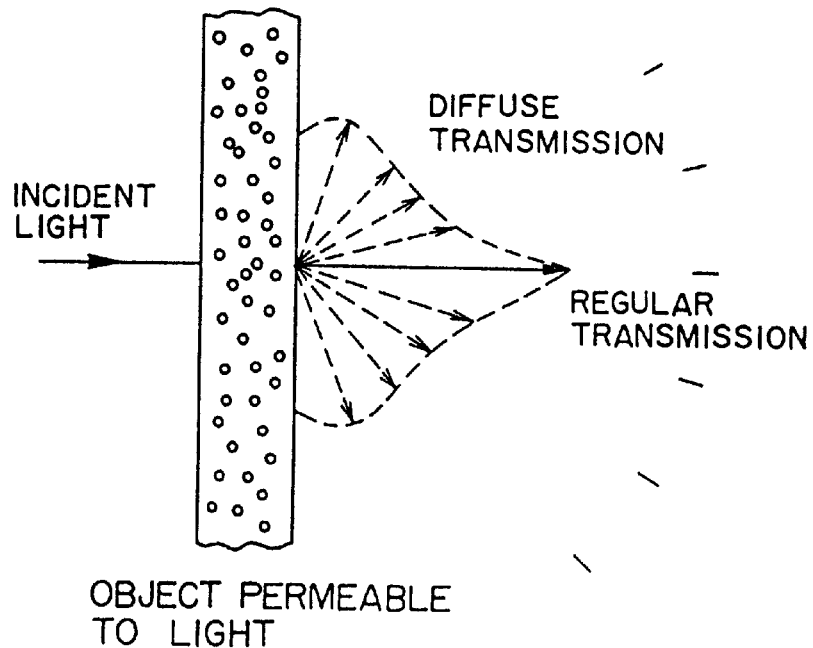
FIG. 22 is a conceptual diagram showing the transmission of light.

On the other hand, the term "antireflection" used herein is intended to means such a phenomenon that the reflection energy of external light is lowered by interference to somewhat reduce the projection of external light and increase the amount of light transmitted through a display (due to a reduction in reflection), enhancing the resolution and contrast. FIG. 21 shows a conceptual diagram showing the reflection of light, and FIG. 22 a conceptual diagram showing the transmission of light.

The term "antiglare-antireflection" used herein is intended to mean that the antiglare property compensates for drawbacks of the antireflection property and vice verse, improving regular reflection of light, diffuse reflection, projection of external light, contrast, and the like. In particular, in the case of a film having an antiglare property, light transmitted from the back gives rise to diffuse reflection, and the use of such a film in a display unfavorably darkens a surface image. By contrast, the antiglare-antireflection film of the present invention has a feature that the reflection is reduced and, at the same time, the transmittance is markedly increased, thereby providing a bright image, an enhanced contrast, and a good visibility. The above antiglare, antireflection, and antiglare-antireflection properties will be compared with one another in the following Table 1.

TABLE 1

| Item | Antiglare | Antireflection | Antiglare-antireflection |
|---|---|---|---|
| Regular reflection | Small | Small | Small |
| Diffuse reflection | Large | Small | Small |
| Projection of external light | Small | Somewhat | Small |
| Amount of regular transmitted light | Small | Large | Somewhat small |
| Amount of diffuse transmitted light | Large | Small | Somewhat large |
| Amount of transmitted light (amount of regular transmitted light + amount of diffuse transmitted light) | Small | Large | Somewhat large |
| Resolution | Low | High | Somewhat high |
| Contrast | Low | High | High |

From Table 1, it is apparent that optical properties required of displays are substantially satisfied by imparting an antiglare-antireflection property. The optical properties required of displays are that the regular reflection on the surface thereof is small, the projection of external light is small, the amount of transmitted light is large enough to provide a bright image, and the amount of regular transmitted light is large enough to provide excellent resolution and contrast.

Transparent Substrate Film

Examples of the transparent substrate film include a triacetyl cellulose film, a diacetyl cellulose film, a cellulose acetate butyrate film, a polyether sulfone film, a polyacrylic resin film, a polyurethane resin film, a polyester film, a polycarbonate film, a polysulfone film, a polyether film, a trimethylpentane film, a polyether ketone film, and a (meth) acrylonitrile film. Among them, a triacetyl cellulose film and a uniaxial stretched polyester film are particularly favorable because they have excellent transparency and no optical anisotropy. The thickness of the transparent substrate film is, in general, preferably in the range of from about 8 to 1000 μm.

Antiglare Layer

The antiglare layer of the present invention has a fine uneven surface. Such a fine uneven surface can be formed, for example, by a method wherein embossing is carried out using a matte embossing film having a fine uneven surface, a method wherein a coating is formed using an antiglare coating solution prepared by adding a matte material, such as plastic beads, to a binder resin, or a method wherein a combination of surface embossing with the addition of a matte material is used. When the surface of the antiglare layer is finely embossed without use of any matte material in order to impart an antiglare property (that is, a property by which light emitted from the interior is diffused to prevent glaring), an advantageous effect can be attained that the transparency of the resultant antiglare-antireflection film is not particularly lowered.

Embossing films used in the formation of a fine uneven surface by embossing include a plastic film, such as releasable PET, the surface of which has been made uneven as desired, and a plastic film, such as PET, with a fine uneven layer being formed thereon. The embossing film may be laminated onto a coating of a resin, for example, a coating of an ultraviolet curing resin followed by irradiation with ultraviolet radiation to cure the coating. In this case, if the embossing film is a film comprising PET as a substrate, the ultraviolet radiation at its short wavelengths is absorbed in the film, making the curing of the ultraviolet curing resin unsatisfactory. For this reason, when an embossing film is applied to a coating of an ultraviolet curing resin, the embossing film should be such that the transmittance in an ultraviolet region of wavelengths 254–300 nm is not less than 20%.

Preferred examples of the matte material used in the formation of a fine uneven surface by adding a matte material to a resin include plastic beads which have a high transparency and a refractive index close to the matrix resin. The selection of a matte material having a refractive index as close as possible to that of the resin enables the antiglare. property to be increased without detriment to the transparency of the coating. Examples of the plastic beads as the matte material include acryl beads, polycarbonate beads, polystyrene beads, and vinyl chloride beads. The particle diameter of these plastic beads is suitably in the range of from 1 to 10 $\mu$m.

When the above matte material is added, it is likely to settle in the resin composition. Inorganic fillers, such as silica, may be added for prevention of settling. The larger the amount of the inorganic filler added, the better the effect of preventing settling of the matte material. However, the addition of the inorganic filler has an adverse effect on the transparency of the coating. For this reason, it is preferred to incorporate into the resin an inorganic filler having a particle diameter of not more than 0.5 $\mu$m in such an amount as will not be detrimental to the transparency of the coating but useful for the prevention of settling, i.e., less than about 0.1% by weight. This silica is different from a silica having a particle diameter of about 5 $\mu$m commonly used as the conventional matte material in that the particle diameter is very small. The addition thereof is not useful for imparting an antiglare property. Further, the particular silica used in the present invention is different from the conventional matte material also in that the conventional matte material is added in an amount of 1 to 30% by weight, whereas in the present invention the particular silica is used in a very small amount of not more than 0.1% by weight. When the present invention is carried out without use of any inorganic filler as a nonsettling suspending agent for preventing settling of the matte material, the matte material settles in the coating solution, making it necessary to bring the coating solution to a homogeneous state by sufficient stirring prior to use of the coating solution.

The binder resin used in the antiglare layer may be any resin (for example, a thermoplastic resin, a thermosetting resin, or an ionizing radiation curing resin) so far as it is transparent. In order to impart hardness to the antiglare layer so that the final antiglare-antireflection film can have excellent hardness, the thickness of the antiglare layer is not less than 0.5 $\mu$m, preferably not less than 3 $\mu$m. The thickness falling within the above range enables the hardness to be maintained and can impart hardness to the antiglare-antireflection film.

In the present invention, "having a hard property" or "hard coat" refers to a coating having a hardness of not less than H as measured by a pencil hardness test specified in JIS K5400.

In order to further improve the hardness of the antiglare layer, it is preferred to use, as a binder resin in the antiglare layer, a reaction curing resin, that is, a thermosetting resin and/or an ionizing radiation curing resin. Examples of the thermosetting resin include a phenolic resin, a urea resin, a diallyl phthalate resin, a melamine resin, a guanamine resin, an unsaturated polyester resin, a polyurethane resin, an epoxy resin, an aminoalkyd resin, a melamine-urea copolycondensed resin, a silicone resin, and a polysiloxane resin. If necessary, curing agents, such as crosslinking agents and polymerization initiators, polymerization accelerators, solvents, viscosity modifiers, and the like may be added to these resins.

The ionizing radiation curing resin is preferably one having an acrylate functional group, and examples thereof include a polyester resin, a polyether resin, an acrylic resin, an epoxy resin, a urethane resin, an alkyd resin, a spiroacetal resin, a polybutadiene resin, and a polythiolpolyene resin having a relatively low molecular weight, an oligomer or a prepolymer of a (meth)acrylate or the like of a polyfunctional compound, such as a polyhydric alcohol, and those containing a relatively large amount of a reactive diluent, such as a monofunctional monomer, such as ethyl (meth)acrylate, ethylhexyl (meth)acrylate, styrene, methylstyrene, or N-vinylpyrrolidone, and a polyfunctional monomer, for example, trimethylolpropane tri(meth)acrylate, hexanediol (meth)acrylate, tripropylene glycol di(meth)acrylate, diethylene glycol di(meth)acrylate, pentaerythritol tri(meth)acrylate, dipentaerythritol hexa(meth)acrylate, 1,6-hexanediol di(meth)acrylate, or neopentyl glycol di(meth)acrylate.

Among them, a mixture of a polyester acrylate with polyurethane acrylate is particularly preferred. The reason for this is as follows. The polyester acrylate provides a coating having a very high hardness and is, therefore, suitable for the formation of a hard coat. Since, however, a coating consisting of polyester acrylate alone has low impact resistance and is fragile, the polyurethane acrylate is used in combination with the polyester acrylate to impart the impact resistance and flexibility to the coating. The proportion of the polyurethane acrylate incorporated is not more than 30 parts by weight based on 100 parts by weight of the polyester acrylate. This is because the incorporation of the polyurethane acrylate in an amount exceeding the above upper limit 30 parts by weight makes the coating so flexible that the hard property is lost.

In order to bring the above ionizing radiation curing resin composition to UV curing type, it is preferred to incorporate, into the ionizing radiation curing resin composition, a photopolymerization initiator, such as an acetophenone compound, a benzophenone compound, Michler's benzoylbenzoate, an $\alpha$-amyloxime ester, tetramethyl thiuram monosulfide, or a thioxanthone compound, and a photosensitizer, such as n-butylamine, triethylamine, or tri-n-butylphosphine. In the present invention, it is particularly preferred to incorporate urethane acrylate or the like as an oligomer and dipentaerythritol hexa(meth)acrylate or the like as a monomer.

A solvent type resin may be incorporated in an amount of 10 to 100 parts by weight based on 100 parts by weight of the ionizing radiation curing resin. A thermoplastic resin is mainly used as the solvent type resin. The solvent type thermoplastic resin added to the ionizing radiation curing resin may be any conventional resin used in the art. In particular, when a blend of a polyester acrylate with a polyurethane acrylate is used as the ionizing radiation curing resin, the use of polymethyl methacrylate acrylate or polybutyl methacrylate acrylate as the solvent type resin enables the hardness of the coating to be kept high. Further, this is advantageous also from the viewpoint of transparency, particularly, low haze value, high transmittance, and compatibility, because since the refractive index of the polymethyl methacrylate acrylate or polybutyl methacrylate acrylate is close to that of the main ionizing radiation curing resin, the transparency of the coating is not lost.

When cellulosic resins, particularly such as triacetyl cellulose, are used as the transparent substrate film, the use of cellulosic resins, such as nitrocellulose, acetyl cellulose, cellulose acetate propionate, and ethylhydroxyethyl cellulose, is advantageous as a solvent type resin incorporated into the ionizing radiation curing resin from the viewpoint of adhesion of coating and transparency.

The reason for this is as follows. When toluene is used as a solvent in combination with the above cellulosic resin, the adhesion between the transparent substrate film and the coating resin can be improved in the coating of a coating solution containing the solvent type resin onto the transparent substrate film, despite fact that triacetyl cellulose as the transparent substrate film is insoluble in toluene. Further, since toluene does not dissolve triacetyl cellulose as the transparent substrate film, the surface of the transparent substrate film is not whitened, enabling the transparency to be maintained.

The antiglare layer may be formed by coating or transfer. In the coating method, an antiglare layer can be formed by coating the above resin composition for an antiglare layer directly or through other layer(s) onto a transparent substrate film, for example, by gravure reverse coating or the like. On the other hand, in the transfer method, an antiglare layer can be formed by coating the above resin composition for an antiglare layer onto an embossing film having a fine uneven surface, for example, by gravure reverse coating or the like, laminating the coated embossing film directly or through other layer(s) onto at least one surface of a transparent substrate film so that the coating faces the transparent substrate film, subjecting the laminate to heat treatment and/or ionizing radiation irradiation treatment to cure the coating, and peeling off the embossing film from the laminate to form an antiglare layer. Alternatively, the antiglare layer may be formed by, before the above lamination, subjecting the coating on the embossing film to heat treatment and/or ionizing radiation irradiation treatment to cure the coating, laminating the embossing film having a cured coating through an adhesive layer onto at least one surface of the transparent substrate film, and peeling off the embossing film from the laminate to form an antiglare layer.

Since the antiglare layer according to the present invention is formed by coating, the thickness thereof, as AT described above, is not less than 0.5 $\mu$m which is larger than a film formed by the vapor growth process (for example, vacuum deposition, sputtering, ion plating, or plasma CVD), enabling a hard property to be imparted to the resultant antiglare-antireflection film.

The refractive index of the antiglare layer may be enhanced by a method wherein a binder resin having a high refractive index is used, a method wherein fine particles having a high refractive index, which is higher than the refractive index of the binder resin used in the antiglare layer, are added to a binder resin, or a method wherein the above two methods are used in combination.

Binder resins having a high refractive index include (1) resins containing an aromatic ring, (2) resins containing halogen atoms except for F, for example, Br, I, and Cl, and (3) resins containing atoms, such as S, N, and P atoms. Resins meeting at least one of these requirements are preferred because they have a high refractive index. Examples of the resin (1) include styrol resins, such as polystyrene, polyethylene terephthalate, polyvinyl carbazole, polycarbonate prepared from bisphenol A.

Examples of the resin (2) include polyvinyl chloride and polytetrabromobisphenol A glycidyl ether. Examples of the resin (3) include polybisphenol S glycidyl ether and polyvinylpyridine.

Examples of the fine particles having a high refractive index include ZnO (refractive index: 1.90), $TiO_2$ (refractive index: 2.3–2.7), $CeO_2$ (refractive index: 1.95), $Sb_2O_5$ (refractive index: 1.71), $SnO_2$, ITO (refractive index: 1.95), $Y_2O_3$ (refractive index: 1.87), $La_2O_3$ (refractive index: 1.95), $ZrO_2$ (refractive index: 2.05), and $Al_2O_3$ (refractive index: 1.63). Among these fine particles having a high refractive index, ZnO, $TiO_2$, $CeO_2$, and the like are preferably used because UV shielding effect can be additionally imparted to the antiglare-antireflection film of the present invention. Further, the use of antimony-doped $SnO_2$ or ITO is preferred because electronic conduction is improved, attaining the effect of preventing the deposition of dust by virtue of antistatic effect, or electromagnetic wave shielding effect when the antiglare-antireflection film of the present invention is used in CRT. In order to make the antiglare layer transparent, it is preferred for the particle diameter of fine particles having a high refractive index to be not more than 400 nm.

In the antiglare layer, when an ionizing radiation curing resin is used as the binder resin, the ionizing radiation curing resin may be cured by the conventional curing method usually employed for curing ionizing radiation curing resins, that is, applying an electron beam or ultraviolet light. For example, in the case of curing with an electron beam, use may be made of an electron beam or the like having an energy of 50 to 1000 KeV, preferably 100 to 300 Kev, emitted from various electron beam accelerators, such as a Cockcroft-Walton (type) accelerator, a van de Graaff accelerator, a resonance transformer accelerator, an insulation core transformer accelerator, a linear accelerator, a dynatron accelerator, and a high frequency accelerator. On the other hand, in the case of curing with UV, use may be made of ultraviolet light or the like emitted from an ultrahigh pressure mercury lamp, a high pressure mercury lamp, a low pressure mercury lamp, a carbon arc, a xenon arc, a metal halide lamp, and the like.

Layer Having Low Refractive Index

A layer having a low refractive index is formed in contact with the above antiglare layer or a hard coat layer which will be described later. The refractive index $n_L$ of the layer having a low refractive index is, of course, lower than the refractive index $n_H$ of the antiglare layer (or hard coat layer). In this case, the approach of the refractive index $n_L$ of the layer having a low refractive index to a requirement represented by following equation (3) improves the antireflection effect. Therefore, the approach to the requirement represented by the equation (3) is preferred.

$$n_L = \sqrt{n_H} \qquad \text{Equation (3)}$$

The material having a low refractive index used in the formation of the layer having a low refractive index may be any material so far as it can meet a requirement represented by the equation (3). However, inorganic materials can be favorably used because they have high hardness and can form a film by the vapor phase growth process. Examples of the inorganic material for forming a layer having a low refractive index include LiF (refractive index: 1.4), $MgF_2$ (refractive index: 1.4), $3NaF.AlF_3$ (refractive index: 1.4), $AlF_3$ (refractive index: 1.4), $Na_3AlF_6$ (cryolite, refractive index: 1.33), $SiO_x$ (x: $1.50 \leq x \leq 4.00$, preferably $1.70 \leq x \leq 2.20$)(refractive index: 1.35–1.48), and $NaMgF_3$ (refractive index: 1.36).

When the layer having a low refractive index is formed on an antiglare layer having a fine uneven surface, it is preferably formed so as to avoid such a phenomenon that the material for a layer having a low refractive index concentrates in recessed portions of the fine uneven surface of the antiglare layer, causing the resultant the layer having a low refractive index on its surface to become flat. In order to avoid this unfavorable phenomenon, the layer having a low refractive index is formed by a gas phase growth process, for example, vacuum deposition, sputtering, reaction sputtering, ion plating, and plasma CVD. The formation of an $SiO_x$ film, wherein x is $1.50 \leq x \leq 4.00$, by the plasma CVD process is particularly preferred because the resultant film has good hardness and surface properties and an excellent adhesion to the resin layer and the process can reduce heat damage to the transparent plastic substrate film as compared with the case where other vapor growth processes are used. The $SiO_x$ will now be described in more detail.

The organic material having a low refractive index is preferably an organic substrate, such as a polymer with a fluorine atom being introduced thereinto because the refractive index is low and not more than 1.45. Polyvinylidene fluoride (refractive index n=1.40) can be mentioned as a resin usable with a solvent because it is easy to handle. When polyvinylidene fluoride is used as the organic material having a low refractive index, the refractive index of the layer having a low refractive index becomes about 1.40. It is also possible to add an acrylate having a low refractive index, such as trifluoroethyl acrylate (refractive index n=1.32), in an amount of 10 to 300 parts by weight, preferably 100 to 200 parts by weight, for the purpose of further lowering the refractive index of the layer having a low refractive index.

It is noted that the trifluoroethyl acrylate is of monofunctional type and, therefore, the strength of the layer having a low refractive index is not satisfactory. For this reason, it is preferred to further add a polyfunctional acrylate, for example, dipentaerythritol hexacrylate (abbreviation: DPHA, tetrafunctional type), which is an ionizing radiation curing resin. The larger the amount of DPHA added, the higher the strength of the layer. However, the lower the amount of DPHA added, the lower the refractive index of the layer having a low refractive index. For this reason, it is recommended that the amount of DPHA added be 1 to 50 parts by weight, preferably 5 to 20 parts by weight.

The layer having a low refractive index can be prepared, for example, by forming a film in a single layer or a plurality layers using an inorganic material having a low refractive index on a hard coat layer having a high refractive index by a vapor growth process (vacuum deposition, sputtering, reactive sputtering, ion plating, plasma CVD, or the like), or alternatively by coating a resin composition, having a low refractive index, containing an inorganic material having a low refractive index or an organic material having a low refractive index to form a coating in a single layer or a plurality of layers.

Optical Functional Membrane

The $SiO_x$ film, wherein x is $1.50 \leq x \leq 4.00$, is not limited to the use in the layer having a low refractive index and can be widely used as an optical functional membrane.

In particular, an $SiO_x$ film formed by the CVD process, preferably plasma CVD process, has a higher density and a higher gas barrier property as compared with the conventional vacuum-deposited film. In addition, it has excellent properties suitable as an optical functional membrane. In particular, since the above $SiO_x$ film has excellent moistureproofness, when an antireflection film having an $SiO_x$ film formed by the plasma CVD process is used with the antireflection film being laminated to a polarizing element, the $SiO_x$ film can advantageously serve to prevent the access of moisture to the polarizing element which is known as having poor resistance to moisture.

Experimental data substantiating the superiority of the $SiO_x$ film formed by the plasma CVD process are given in the following Table 2. Films used for the moistureproof experiment were a triacetyl cellulose film (indicated as "TAC"), a triacetyl cellulose film with a 7 μm-thick hard coat resin coating being formed thereon [indicated as "HC (7 μm)/TAC"], a triacetyl cellulose film with a 1 μm-thick vinylidene fluoride coating being formed thereon [indicated as "K coat: vinylidene fluoride (1 μm)/TAC"], and a triacetyl cellulose film with a 1000 Å-thick plasma CVD film of $SiO_x$ being formed thereon [indicated as "$SiO_x$ (1000 Å)/TAC"]. These films were subjected to measurement of moisture permeability per day under conditions of a humidity of 90% and a temperature of 40° C. according to a moistureproofness test specified in JIS (Z0208).

TABLE 2

| Layer construction (the layer on the left side being the top layer) | Moisture permeability (per day) |
|---|---|
| TAC | 600 g/m² |
| HC(7 μm)/TAC | 300 g/m² |
| K coat: vinylidene fluoride (1 μm)/TAC | 20 g/m² |
| $SiO_x$ (1000 Å)/TAC | Not more than 5 g/m² |

From Table 2, it is apparent that $SiO_x$(1000 Å)/TAC has the lowest moisture permeability, i.e., excellent moistureproofness. Although vinylidene fluoride (1 μm)/TAC has somewhat good moistureproofness, it cannot be suitably used as an optical material because the coating is soft and yellows with time.

When the plasma CVD film is used with a polarizing element or other layers containing a dye or the like, the gas barrier property of the plasma CVD film can prevent the deterioration of the dye or the like. The $SiO_x$ film formed by the plasma CVD process has a high density and, hence, can be a scratch-resistant film.

As compared with the conventional vacuum-deposited film, the plasma CVD process can relatively easily vary the x value of the $SiO_x$ film. Further, the x value of the conventional vacuum-deposited film is less than 2, whereas in the case of the plasma CVD process, the x value can exceed 2. This enables the $SiO_x$ film formed by the plasma CVD process to have a lower refractive index than the conventional vacuum-deposited film, offering an advantage that the resultant film has a high transparency. Further, the plasma CVD film is superior to the conventional vacuum-deposited film in adhesion to the substrate.

Difference in properties between the $SiO_x$ film formed by the vacuum deposition process and the $SiO_x$ film formed by the plasma CVD process is shown in the following Table 3.

TABLE 3

|  | Vacuum deposition | Plasma CVD |
|---|---|---|
| Density | Low (Particles collide with one another to cause adhesion of $SiO_x$ mass to form a film) | High (After deposition on substrate, the deposit becomes an $SiO_x$ film) |
| O content | X < 2 | X > 2 is also possible. The oxygen content is higher than that for vapor deposition |
| Gas barrier property | Low | High |
| Transparency | Likely to cause color change (yellowing) | Transparent |
| Refractive index | High | Low |
| Coefficient of friction | High | Low |

In the present invention, the silicon oxide film as an optical functional membrane preferably comprises an $SiO_x$ film, wherein x is $1.50 \leq x \leq 4.00$, of which the surface has a contact angle with water of 40 to 180°, preferably not less than 70°, particularly preferably not less than 100°. According to the finding by the present inventor, when the contact angle is not less than 40°, the antifouling is improved, rendering the film suitable for use as an optical functional membrane.

The coefficient of dynamic friction of the $SiO_x$ film is preferably not more than 1, still preferably not more than 0.5. In this case, the coefficient of dynamic 25 friction is a value as measured by a method specified in JIS-K7125. As the coefficient of dynamic friction decreases, particularly when it is not more than 1, the slidability of the surface of the membrane is likely to increase, favorably increasing the scratch resistance or fracture resistance of the surface of the film.

The $SiO_x$ film, as described above, is preferably formed by the CVD process, preferably plasma CVD process.

The term "plasma CVD" used herein is intended to mean, among CVD's, a conventional process using plasma. For plasma CVD, in general, heat energy is used together with electric energy. Specifically, in plasma CVD, a starting gas for a contemplated silicon oxide film creates plasma in a CVD device by discharging, realizing non-equilibrium conditions under which a film forming reaction is allowed to proceed.

In the present invention, the formation of the $SiO_x$ film by the plasma CVD under the following conditions are particularly preferred from the viewpoint of forming a silicon oxide film which is excellent in both optical properties and surface properties.

(a) An organosiloxane is used as a starting gas.
(b) Plasma is formed from a starting gas by discharging.
(c) CVD is carried out in the absence of an inorganic vapor deposition source.
(d) The substrate film, on which the $SiO_x$ film is to be vapor-deposited, is maintained at a relatively low temperature.
(e) Film forming conditions are such that an organosiloxane remaining undecomposed is present in the resultant $SiO_x$ film.

Silanes or siloxanes commonly called "organosilicon" may be properly used as the organosiloxane which serves as the starting gas. Specific examples of the organosiloxane include methyltrimethoxysilane, dimethyldiethoxysilane, tetraethoxysilane, vinyltriethoxysilane, 3-methacryloxypropyl trimethoxysilane, vinyl-tris(2-methoxyethoxy)silane, tetramethoxysilane, trimethylethoxysilane, vinyltriacetoxysilane, ethyltriethoxysilane, tetrakis(2-ethylhexoxy)silane, vinyltrimethoxysilane, tetrakis(2-methoxyethoxy)silane, methylphenyldimethoxysilane, tetrakis(methoxyethoxyethoxy)silane, tetramethylsilane, dimethyldimethoxysilane, n-propyltrimethoxysilane, tetrakis(2-ethylbutoxy)silane, n-octyltriethoxysilane, acetoxypropyltrimethoxysilane, tris(trimethylsiloxy)phenylsilane, octamethylcyclotetrasiloxane, hexamethyldisiloxane, octamethyltrisiloxane, 1,2,3,3-tetrakis(trimethylsiloxy)disiloxane, and pentamethyldisiloxane. They may be used alone or in the form of a mixture of two or more.

Further, in the present invention, it is preferred not to use a solid inorganic silicon compound as the deposition source. Furthermore, in the present invention, the CVD process is carried out preferably under such film forming conditions that a starting gas (organosiloxane) remaining undecomposed is present in the resultant $SiO_x$ film. Specifically, an $SiO_x$ film, which is excellent in both optical properties and surface properties, can be formed when the starting gas is not completely decomposed and the organosiloxane remaining undecomposed is included or incorporated in the resultant silicon oxide film. The above film forming conditions are particularly advantageous from the viewpoint of increasing the contact angle of the surface of the film and regulating the coefficient of dynamic friction to a small value range.

In the formation of an $SiO_x$ film by the plasma CVD process, it is generally considered that organosiloxane activated by plasma collides with a substrate, and the organosiloxane adsorbed on the surface of the substrate is reacted with activated organosiloxane from a gas phase and oxygen to remove an organic group containing carbon, thereby growing an $SiO_x$ film while forming a matrix of Si—O—Si. In this case, it is considered that when the plasma energy is low or the concentration of active oxygen in plasma is low, the organosiloxane on the surface of the substrate is not completely decomposed to leave the organic group, leaving a group like silicone rubber or silicone grease on the surface (and partly within the substrate) to develop such a property that the water repellency or the coefficient of friction is reduced.

However, when the decomposition of the organosiloxane is incomplete and the oxidation number of Si is small, the refractive index of the formed film becomes large, rendering the $SiO_x$ film unpractical as a layer having a low refractive index of the antireflection film. On the other hand, when the organosiloxane is completely decomposed to completely consume the organic group on the surface of the resultant film, the refractive index becomes low. In this case, however, the surface of the resultant film becomes hydrophilic, which is likely to cause dirt to deposit on the surface of the film and, at the same time, makes it difficult to remove the deposited dirt. Further, the coefficient of friction too becomes large, inducing defects such as scratch. These renders the resultant film unpractical as a surface layer of the antireflection film. For this reason, care should be taken to control the film forming conditions.

For reference, properties of films formed by various processes are listed below.

| Sample | Contact angle (°) | Coefficient of friction | Refractive index | Starting material |
|---|---|---|---|---|
| (Film formation by vacuum deposition) | | | | |
| SiO$_2$/HC/TAC | 32 | 1.50 | 1.44 | SiO$_2$ |
| (Film formation by batch plasma CVD) | | | | |
| SiO$_x$/HC/TAC(1) | 50 | 1.10 | 1.42 | HMDSO + O$_2$ |
| SiO$_x$/HC/TAC(2) | 104 | 0.44 | 1.44 | HMDSO + O$_2$ |
| SiO$_x$/HC/TAC(3) | 155 | 0.40 | 1.60 | HMDSO + O$_2$ |
| (Film formation by continuous plasma CVD) | | | | |
| SiO$_x$/HC/TAC(1) | 55 | 0.45 | 1.42 | HMDSO + O$_2$ |
| SiO$_x$/HC/TAC(2) | 102 | 0.47 | 1.44 | HMDSO + O$_2$ |
| SiO$_x$/HC/TAC(3) | 152 | 0.40 | 1.50 | HMDSO + O$_2$ |
| (Film formation by continuous plasma CVD followed by corona treatment of the film on its surface) | | | | |
| SiO$_x$/HC/TAC | 59 | 0.92 | 1.44 | HMDSO + O$_2$ |
| (Film formation by batch plasma CVD) | | | | |
| SiO$_x$/HC/TAC | 43.9 | 1.13 | 1.44 | SiH$_4$ |
| (Film formation by vacuum deposition) | | | | |
| SiO$_x$/HC/TAC | 11.2 | 1.12 | 1.50 | SiO |
| SiO$_x$/HC/TAC | 12.3 | 1.89 | 1.50 | SiO |
| Saponified TAC | 19 | — | — | |

In the above table, the abbreviated layer or compound identifications have the following meanings:

HC: hard coat layer

TAC: triacetyl cellulose film

HMDSO: hexamethyldisiloxane

SiO$_x$/HC/TAC: layer construction wherein HC and SiO$_x$ layer are formed in that order on TAC layer Additional Layers In the antireflection film of the present invention, layers for imparting various functions may be further provided in addition to the above layers. For example, in order to improve the adhesion between the transparent substrate film and the hard coat layer or for other purposes, it is possible to provide a primer layer or an adhesive layer on the transparent substrate film. Further, in order to improve the hard property or antiglare property, the hard coat layer and the antiglare layer may be separately provided, or alternatively these layers may be provided respectively in a plurality of layers.

The refractive index of the additional layers provided between the transparent substrate film and the antiglare layer is preferably intermediate between the refractive index of the transparent substrate film and the refractive index of the antiglare layer.

The additional layers provided between the transparent substrate film and the antiglare layer, as described above, may be formed directly or indirectly on the transparent substrate film by coating. When a hard coat layer is formed on a transparent substrate film by transfer, it is also possible to use a method wherein a contemplated additional layer is formed by coating on a hard coat layer which has been previously formed on an embossing film (or alternatively on an embossing film having a fine uneven surface) and then transferred to a transparent substrate film.

An adhesive or a pressure sensitive adhesive may be applied on the underside of the antiglare-antireflection film, and, for use, the resultant coated antireflection film may be applied onto the surface of an object from which reflection should be prevented.

Hard Coat Layer

The binder resin usable in the hard coat layer may be any resin (for example, a thermoplastic resin, a thermosetting resin, or an ionizing radiation curing resin) so far as it is transparent. In order to impart a hard property to the antireflection film, the thickness of the antireflection layer is not less than 0.5 μm, preferably not less than 3 μm. The thickness falling within the above range enables the hardness to be maintained and can impart a hard property to the antireflection film.

In the present invention, "having a hard property" or "hard coat" refers to a coating having a hardness of not less than H as measured by a pencil hardness test specified in JIS K5400.

In order to further improve the hardness of the hard coat layer, it is preferred to use, as a binder resin in the hard coat layer, a reaction curing resin, that is, a thermosetting resin and/or an ionizing radiation curing resin. Examples of the thermosetting resin include a phenolic resin, a urea resin, a diallyl phthalate resin, a melamine resin, a guanamine resin, an unsaturated polyester resin, a polyurethane resin, an epoxy resin, an aminoalkyd resin, a melamine-urea copolycondensed resin, a silicone resin, and a polysiloxane resin. If necessary, curing agents, such as crosslinking agents and polymerization initiators, polymerization accelerators, solvents, viscosity modifiers, and the like may be added to these resins.

The ionizing radiation curing resin is preferably one having an acrylate functional group, and examples thereof include a polyester resin, a polyether resin, an acrylic resin, an epoxy resin, a urethane resin, an alkyd resin, a spiroacetal resin, a polybutadiene resin, and a polythiolpolyene resin having a relatively low molecular weight, an oligomer or a prepolymer of a (meth)acrylate or the like of a polyfunctional compound, such as a polyhydric alcohol, and those containing a relatively large amount of a reactive diluent, such as a monofunctional monomer, such as ethyl (meth) acrylate, ethylhexyl (meth)acrylate, styrene, methylstyrene, or N-vinylpyrrolidone, and a polyfunctional monomer, for example, trimethylolpropane tri(meth)acrylate, hexanediol (meth)acrylate, tripropylene glycol di(meth)acrylate, diethylene glycol di(meth)acrylate, pentaerythritol tri(meth) acrylate, dipentaerythritol hexa(meth)acrylate, 1,6-hexanediol di(meth)acrylate, or neopentyl glycol di(meth) acrylate.

Among them, a mixture of a polyester acrylate with polyurethane acrylate is particularly preferred. The reason for this is as follows. The polyester acrylate provides a coating having a very high hardness and is, therefore, suitable for the formation of a hard coat. Since, however, a coating consisting of polyester acrylate alone has low impact resistance and is fragile, the polyurethane acrylate is used in combination with the polyester acrylate to impart the impact resistance and flexibility to the coating. The proportion of the polyurethane acrylate incorporated is not more than 30 parts by weight based on 100 parts by weight of the polyester acrylate. This is because the incorporation of the polyurethane acrylate in an amount exceeding the above upper limit 30 parts by weight makes the coating so flexible that the hard property is lost.

In order to bring the above ionizing radiation curing resin composition to UV curing type, it is preferred to incorporate, into the ionizing radiation curing resin composition, a photopolymerization initiator, such as an acetophenone compound, a benzophenone compound, Michler's benzoylbenzoate, an α-amyloxime ester, tetramethyl thiuram monosulfide, or a thioxanthone compound, and a photosensitizer, such as n-butylamine, triethylamine, or tri-n-butylphosphine. In the present invention, it is particularly preferred to incorporate urethane acrylate or the like as an oligomer and dipentaerythritol hexa(meth)acrylate or the like as a monomer.

A solvent type resin may be incorporated in an amount of 10 to 100 parts by weight based on 100 parts by weight of the ionizing radiation curing resin. A thermoplastic resin is mainly used as the solvent type resin. The solvent type thermoplastic resin added to the ionizing radiation curing resin may be any conventional resin used in the art. In particular, when a blend of a polyester acrylate with a polyurethane acrylate is used as the ionizing radiation curing resin, the use of polymethyl methacrylate acrylate or polybutyl methacrylate acrylate as the solvent type resin enables the hardness of the coating to be kept high. Further, this is advantageous also from the viewpoint of transparency, particularly, low haze value, high transmittance, and compatibility, because since the refractive index of the polymethyl methacrylate acrylate or polybutyl methacrylate acrylate is close to that of the main ionizing radiation curing resin, the transparency of the coating is not lost.

When cellulosic resins, particularly such as triacetyl cellulose, are used as the transparent substrate film, the use of cellulosic resins, such as nitrocellulose, acetyl cellulose, cellulose acetate propionate, and ethylhydroxyethyl cellulose, is advantageous as a solvent type resin incorporated into the ionizing radiation curing resin from the viewpoint of adhesion of coating and transparency.

The reason for this is as follows. When toluene is used as a solvent in combination with the above cellulosic resin, the adhesion between the transparent substrate film and the coating resin can be improved in the coating of a coating solution containing the solvent type resin onto the transparent substrate film, despite the fact that triacetyl cellulose as the transparent substrate film is insoluble in toluene. Further, since toluene does not dissolve triacetyl cellulose as the transparent substrate film, the surface of the transparent substrate film is not whitened, enabling the transparency to be maintained.

The hard coat layer may be formed by coating or transfer. In the coating method, a hard coat layer can be formed by coating the above resin composition for a hard coat layer directly or through other layer(s) onto a transparent substrate film, for example, by gravure reverse coating or the like. On the other hand, in the transfer method, a hard coat layer can be formed by coating the above resin composition for a hard coat layer onto a release film having a smooth surface, for example, by gravure reverse coating or the like, laminating the above coated release film directly or through other layer(s) onto at least one surface of a transparent substrate film so that the coating faces the transparent substrate film, subjecting the laminate to heat treatment and/or ionizing radiation irradiation treatment to cure the coating, and peeling off the release film from the laminate to form a hard coat layer. Alternatively, the hard coat layer may be formed by, before the above lamination, subjecting the coating on the release film to heat treatment and/or ionizing radiation irradiation treatment to cure the coating, laminating the release film having a cured coating prepared in the above step through an adhesive layer onto at least one surface of the transparent substrate film in such a manner that the coating on the release film faces the transparent substrate, and peeling off the release film from the laminate to form a hard coat layer.

Since the hard coat layer according to the present invention is formed by coating, the thickness thereof is not less than 0.5 $\mu$m which is larger than a film formed by the vapor growth process (for example, vacuum deposition, sputtering, ion plating, or plasma CVD), enabling a hard property to be imparted to the resultant antireflection film.

The refractive index of the hard coat layer may be enhanced by a method wherein a binder resin having a high refractive index is used, a method wherein fine particles having a high refractive index, which is higher than the refractive index of the binder resin used in the hard coat layer, are added to a binder resin, or a method wherein the above two methods are used in combination.

Binder resins having a high refractive index include (1) resins containing an aromatic ring, (2) resins containing halogen atoms except for F, for example, Br, I, and Cl, and (3) resins containing atoms, such as S, N, and P atoms. Resins meeting at least one of these requirements are preferred because they have a high refractive index. Examples of the resin (1) include styrol resins, such as polystyrene, polyethylene terephthalate, polyvinyl carbazole, polycarbonate prepared from bisphenol A. Examples of the resin (2) include polyvinyl chloride and polytetrabromobisphenol A glycidyl ether. Examples of the resin (3) include polybisphenol S glycidyl ether and polyvinylpyridine.

Examples of the fine particles having a high refractive index include ZnO (refractive index: 1.90), $TiO_2$ (refractive index: 2.3–2.7), $CeO_2$ (refractive index: 1.95), $Sb_2O_5$ (refractive index: 1.71), $SnO_2$, ITO (refractive index: 1.95), $Y_2O_3$ (refractive index: 1.87), $La_2O_3$ (refractive index: 1.95), $ZrO_2$ (refractive index: 2.05), and $Al_2O_3$ (refractive index: 1.63). Among these fine particles having a high refractive index, ZnO, $TiO_2$, $CeO_2$, and the like are preferably used because UV shielding effect can be additionally imparted to the antireflection film of the present invention. Further, the use of antimony-doped $SnO_2$ or ITO is preferred because electronic conduction is improved, attaining the effect of preventing the deposition of dust by virtue of antistatic effect, or electromagnetic wave shielding effect when the antireflection film of the present invention is used in CRT. In order to make the hard coat layer transparent, it is preferred for the particle diameter of fine particles having a high refractive index to be not more than 400 nm.

In the hard coat layer, when an ionizing radiation curing resin is used as the binder resin, the ionizing radiation curing resin may be cured by the conventional curing method usually employed for curing ionizing radiation curing resins, that is, applying an electron beam or ultraviolet light. For example, in the case of curing with an electron beam, use may be made of an electron beam or the like having an energy of 50 to 1000 KeV, preferably 100 to 300 Kev, emitted from various electron beam accelerators, such as a Cockcroft-Walton (type) accelerator, a van de Graaff accelerator, a resonance transformer accelerator, an insulation core transformer accelerator, a linear accelerator, a dynatron accelerator, and a high frequency accelerator. On the other hand, in the case of curing with UV, use may be made of ultraviolet light or the like emitted from an ultrahigh pressure mercury lamp, a high pressure mercury lamp, a low pressure mercury lamp, a carbon arc, a xenon arc, a metal halide lamp, and the like.

Antireflection in Interface

Figure 5:
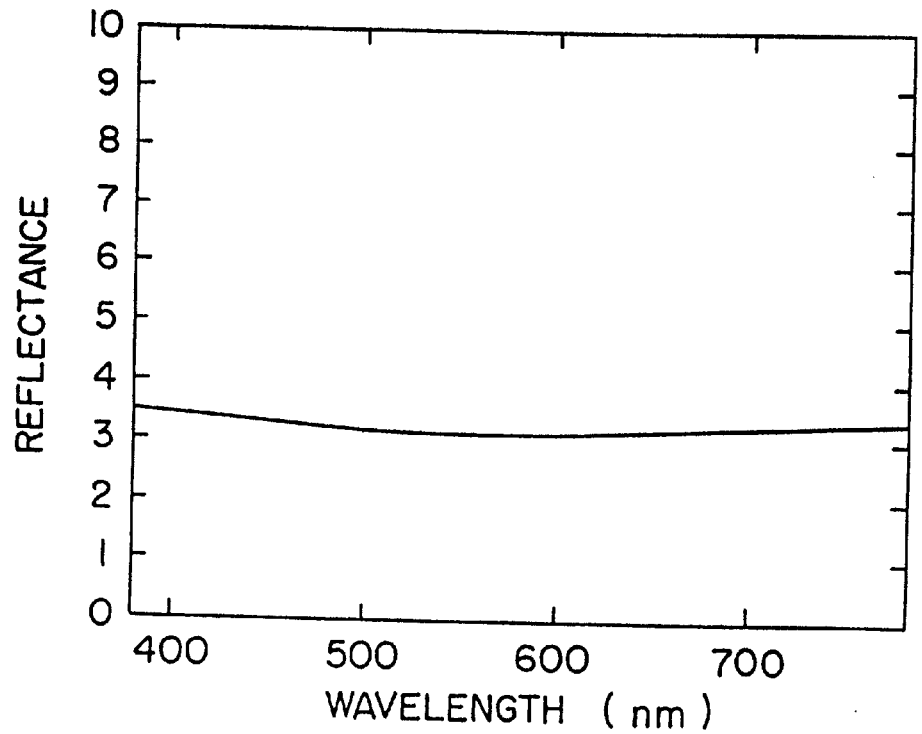
FIG. 5 is a diagram showing a spectral reflectance curve for a laminate film shown in FIG. 1.

FIG. 1 is a diagram showing a laminate film comprising a triacetyl cellulose film (hereinafter referred to as "TAC substrate film") 1 having a refractive index of 1.49 and, formed thereon, a vapor-deposited $SiO_x$ film 3 having a refractive index of 1.46. A spectral reflectance curve for this laminate film is shown in FIG. 5.

Figure 6:
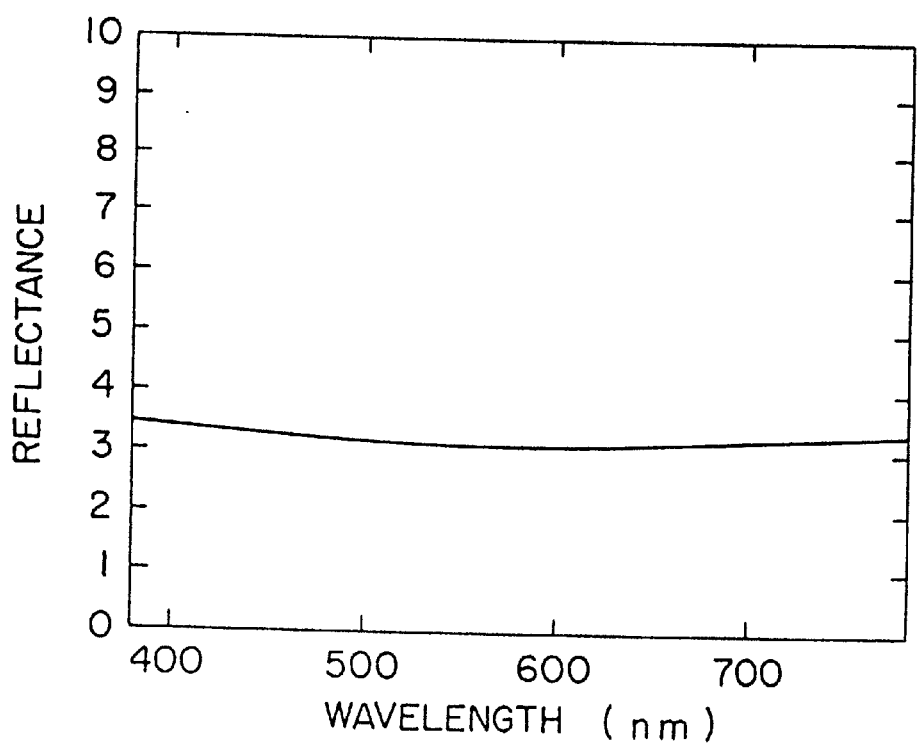
FIG. 6 is a diagram showing a spectral reflectance curve for a laminate film shown in FIG. 2.

FIG. 2 is a diagram showing a laminate film comprising a TAC substrate film 1 having a refractive index of 1.49 and, formed thereon in the following order, a hard coat layer (hereinafter referred to as "HC layer") 2 having a refractive index of 1.49 and a vapor-deposited $SiO_x$ film 3 having a refractive index of 1.46. A spectral reflectance curve for this laminate film is shown in FIG. 6.

Figure 7:
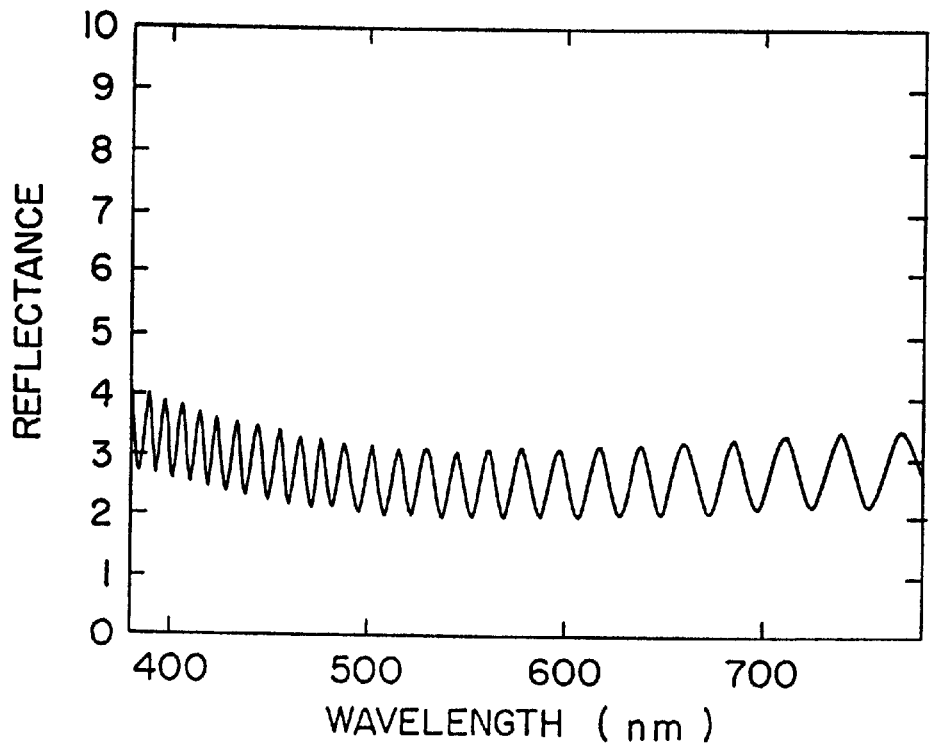
FIG. 7 is a diagram showing a spectral reflectance curve for a laminate film shown in FIG. 3.

FIG. 3 is a diagram showing a laminate film having the same layer construction as the laminate film shown in FIG. 2 except that the refractive index of the HC layer has been enhanced, that is, a laminate film comprising a TAC substrate film 1 having a refractive index of 1.49 and, formed thereon in the following order, a 6 μm-thick HC layer 2 having a refractive index of 1.55 and a vapor-deposited $SiO_x$ film 3 having a refractive index of 1.46. A spectral reflectance curve for this laminate film is shown in FIG. 7. When the spectral reflectance curve shown in FIG. 7 is put on that shown in FIG. 6, it is apparent that the top portions of the waves around the target wavelength 550 nm (to which the eye of the human being is said to be most sensitive) overlap with the curve shown in FIG. 6. In the other wavelengths in FIG. 7, the reflectance becomes low due to a reduction in the height of the waves.

This indicates that the reflection in the interface of layers can be prevented by making the refractive index of the HC layer located between the vapor-deposited $SiO_x$ layer and the TAC substrate film higher than that of the other layers.

Figure 8:
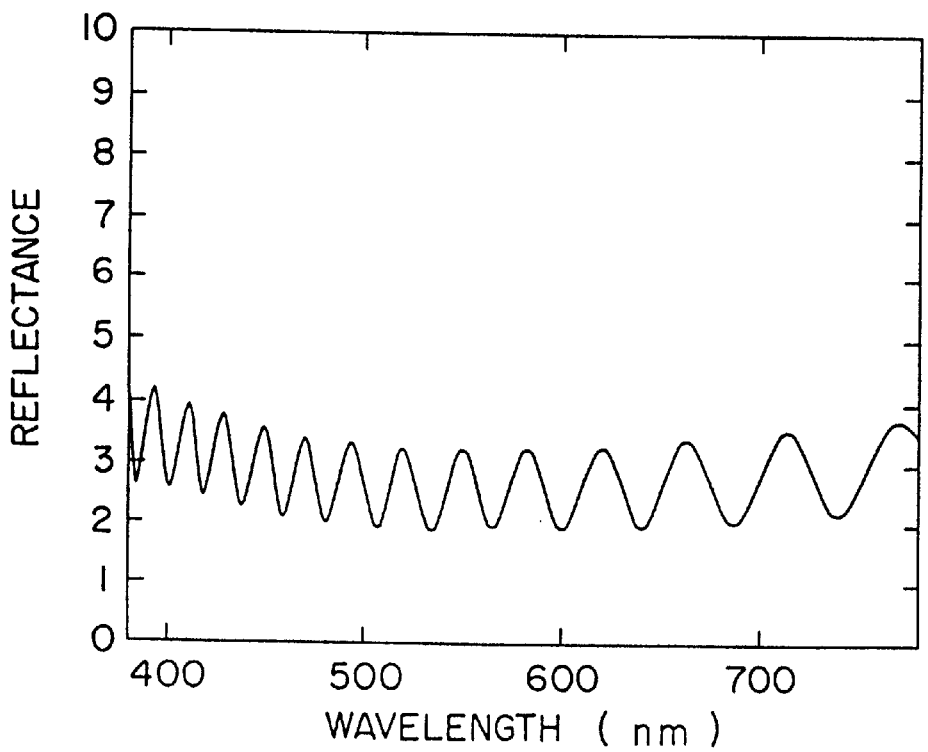
FIG. 8 is a diagram showing a spectral reflectance curve indicating that the wave pitch increases with decreasing the film thickness.

The spectral reflectance curve shown in FIG. 8 indicates that the pitch of the wave increases with decreasing the film thickness. In this case, it is apparent that the tendency of reflectance observed as a relationship between FIG. 5 and FIG. 8 is the same as the tendency of reflectance observed as a relationship between FIG. 6 and FIG. 7. The laminate film having a spectral reflectance curve shown in FIG. 8 comprises substrate TAC (refractive index 1.49)/HC layer (film thickness 3 μm, refractive index 1.55)/antireflection layer (film thickness 95 nm, refractive index 1.46).

Figure 9:
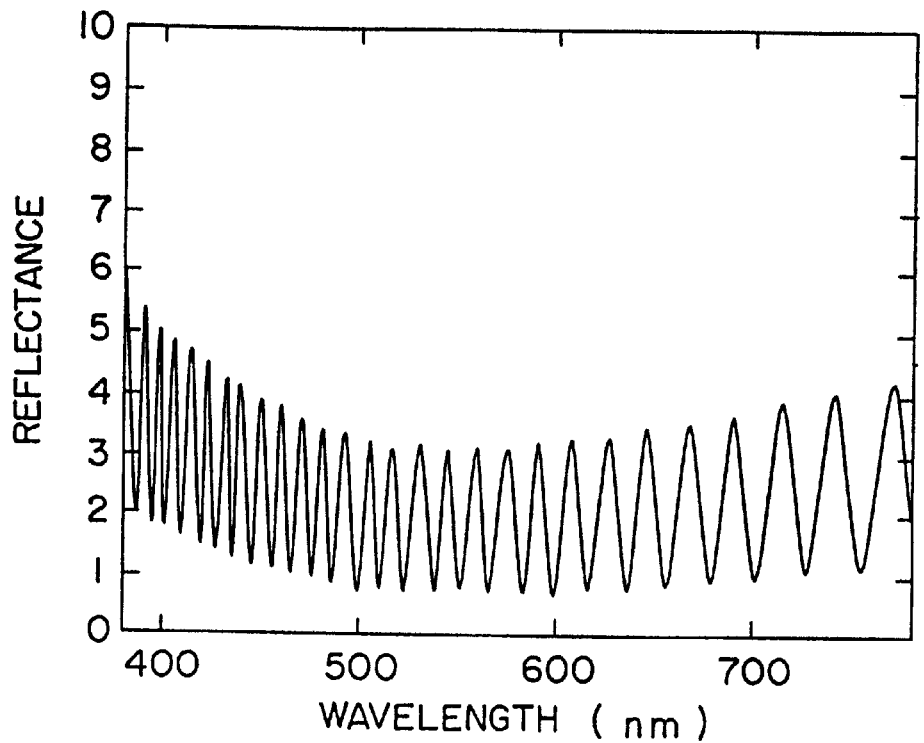
FIG. 9 is a diagram showing a spectral reflectance curve for the same laminate film as shown in FIG. 3 except that the refractive index of the hard coat layer has been increased to 1.65.

FIG. 9 shows a spectral reflectance curve for a laminate film having the same layer construction as the laminate film shown in FIG. 3 except that the refractive index of the HC layer has been enhanced to 1.65. It is apparent that an increase in the refractive index of the HC layer increases the size (depth) of the wave, enabling the refractive index to be lowered.

Figure 10:
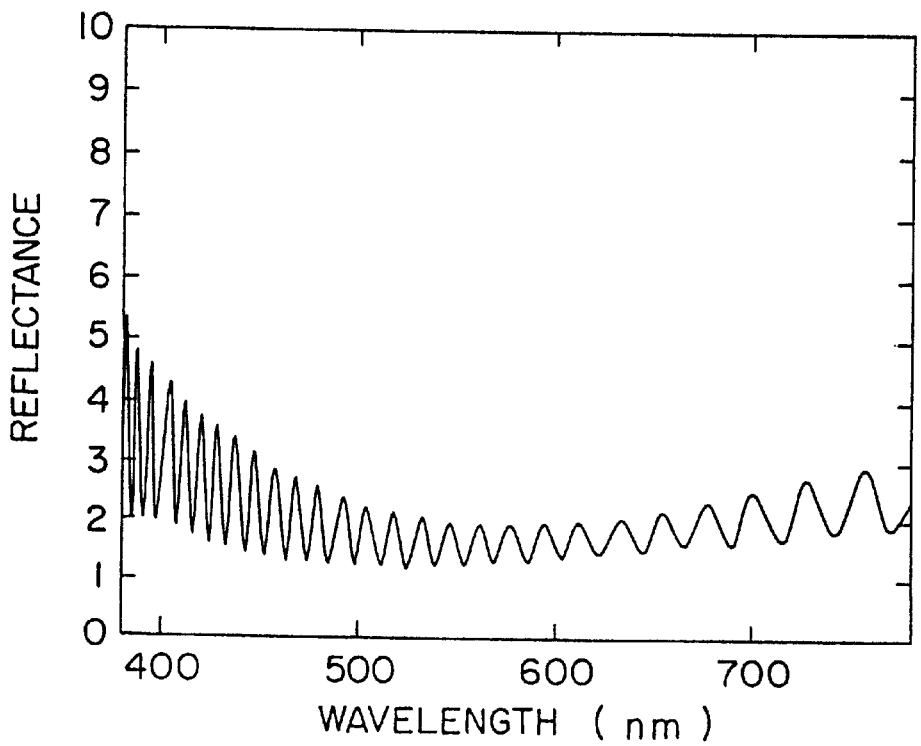
FIG. 10 is a diagram showing a spectral reflectance curve for a laminate film shown in FIG. 4.

FIG. 4 shows a laminate film comprising a saponified TAC substrate film 1 having a refractive index of 1.49 and, provided thereon in the following order, a primer layer 4 having a refractive index of 1.55, a HC layer 2, having a refractive index of 1.65, comprising a resin with fine particles of ZnO having a high refractive index being dispersed therein, and a vapor-deposited $SiO_x$ film 3 having a refractive index of 1.46. In this case, the primer layer 4 has a smaller thickness than the HC layer 2 and a refractive index approximately intermediate between the refractive index of the HC layer 2 and that of the TAC substrate film 1. FIG. 10 shows a spectral reflectance curve for the laminate film shown in FIG. 4. According to the spectral reflectance curve shown in FIG. 10, the spectral reflectance of this laminate film is intermediate between the top of the wave and the bottom of the wave in the spectral reflectance curve shown in FIG. 9, and around the target wavelength 550 nm, the height of the wave becomes low, indicating that there occurred such an effect as could be attained when a material having a lower refractive index than that of $SiO_x$ has been laminated on the outermost layer.

Since, however, the HC layer and the primer layer are each a coating formed, for example, by roll coating, the interface of the HC layer and the transparent substrate film, it is considered that the interface of the HC layer and the primer layer, and the interface of the primer and the transparent substrate film are not clear, creating no significant difference in refractive index therebetween. Therefore, in fact, such clear waves as will appear in the spectral reflectance curve are not likely to occur.

Figure 11:
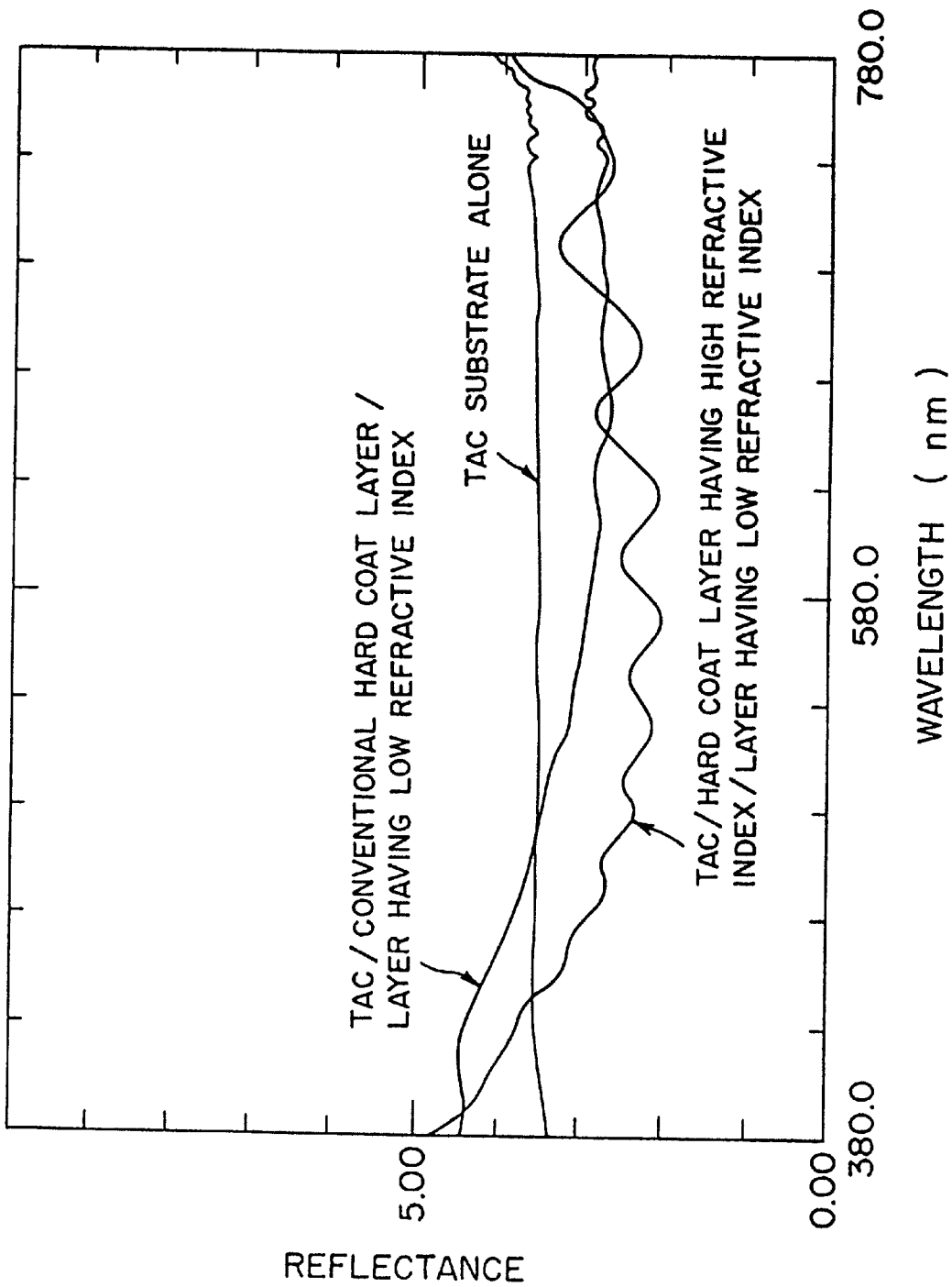
FIG. 11 is a diagram showing a comparison of a spectral reflectance curve for a laminate film having a layer construction of TAC substrate film (refractive index 1.49)/hard coat layer having a high refractive index (refractive index 1.62)/layer having a low refractive index (refractive index 1.46) with those for other laminate films.

FIG. 11 is a spectral reflectance curve for a laminate film having a layer construction of TAC substrate film (refractive index 1.49)/hard coat layer having a high refractive index (refractive index 1.62)/layer having a low refractive index (refractive index 1.46). For comparison, a spectral reflectance curve for a TAC substrate film and a laminate film having a layer construction of TAC substrate film (refractive index 1.49)/conventional hard coat layer (refractive index 1.49)/layer having low refractive index (refractive index 1.46) are also shown in FIG. 11. As can be seen FIG. 11, the wave substantially disappears on the short wavelength side.

Polarizing Plate and Liquid Crystal Display

The antiglare-antireflection film of the present invention can be laminated to a polarizing element to provide a polarizing plate having improved antireflection properties. A polyvinyl alcohol film, a polyvinyl formal film, a polyvinyl acetal film, and a saponified film of an ethylene-vinyl acetate copolymer, these films having been colored by iodine or a dye and stretched, may be used in the polarizing element. In the lamination of the antiglare-antireflection film to the polarizing plate, when the transparent substrate film of the antiglare-antireflection film is, for example, a triacetyl cellulose film, the triacetyl cellulose film is saponified in order to improve the adhesion and for destaticization purposes. The saponification treatment may be carried out before or after the application of the hard coat on the triacetyl cellulose film.

FIG. 19 shows an embodiment of a polarizing plate using the antiglare-antireflection film of the present invention. In the drawing, a laminate comprising a TAC (abbreviation for triacetyl cellulose) film 19, an antiglare layer 12 having a high refractive index, and a layer 13 having a low refractive index corresponds to the antiglare-antireflection film of the present invention, and this antiglare-antireflection film is laminated on one surface of a polarizing element 20 with a TAC film 19 being laminated on the other surface of the polarizing element 20. An adhesive layer is optionally provided between layers constituting the polarizing plate. It is particularly preferred to provide an adhesive layer between the antiglare layer 12 having a high refractive index and the TAC film 19 as a transparent substrate film. The layer construction of the polarizing plate shown in FIG. 19 can be simply represented as TAC film/polarizing element/antiglare-antireflection film.

FIG. 20 shows an embodiment of a liquid crystal display using the antiglare-antireflection film of the present invention. The polarizing plate shown in FIG. 19, that is, a polarizing plate having a layer construction of TAC film/polarizing element/antiglare-antireflection film, is laminated on one surface of a liquid crystal display element 21 with a polarizing plate having a layer construction of a TAC film/polarizing element/TAC film being laminated on the other surface of the liquid crystal display element 21. In the liquid crystal display shown in FIG. 20, a layer having a high refractive index as an antireflection layer may be provided on the underside of the TAC film 19 as the lowermost layer, and a layer having a low refractive index may be further provided on the surface of the layer having a high refractive index remote from the TAC film 19. In the case of an STN type liquid crystal display, a phase plate is inserted between the liquid crystal display element 21 and the polarizing plate. An adhesive layer is optionally provided between layers constituting the liquid crystal display device.

FIG. 14B shows an embodiment of a polarizing plate using an antireflection film according to another embodiment of the present invention. In the drawing, numeral 150 designates the antireflection film of the present invention which, as described above, comprises a TAC (triacetyl cellulose) film 170 as a transparent substrate film, a hard coat layer 120 having a high refractive index, and a layer 130 having a low refractive index. The antireflection film 15 is laminated on one surface of a polarizing element 160 with a TAC film 170 being laminated on the other surface of the polarizing element 160. An adhesive layer is optionally provided between layers constituting the polarizing plate. It is particularly preferred to provide an adhesive layer between the hard coat layer 120 having a high refractive index and the TAC film 170 as a transparent substrate film. The layer construction of the polarizing plate shown in FIG. 14B can be simply represented as TAC film/polarizing element/antireflection film. According to a further embodiment of the polarizing plate using the antireflection film of the present invention, the antireflection film 150 of the present invention may be laminated onto both surfaces of the polarizing element 160.

FIG. 15 shows an embodiment of a liquid crystal display device using the antireflection film of the present invention.

A polarizing plate shown in FIG. 14B, that is, a polarizing plate having a layer construction of TAC film/polarizing element/antireflection film, is laminated on one surface of a liquid crystal display element 180 with a polarizing plate having a layer construction of TAC film/polarizing element/TAC film being laminated on the other surface of the liquid crystal display element 180. In the liquid crystal display device shown in FIG. 15B, a hard coat layer 120 having a high refractive index may be provided on the underside of the TAC film 170 as the lowermost layer, and a layer 130 having a low refractive index may be further provided on the surface of the hard coat layer 120 having a high refractive index remote from the TAC film 170. In the liquid crystal display device shown in FIG. 15B, back light is applied through the underside of the device. In the case of an STN type liquid crystal display device, a phase plate is inserted between the liquid crystal display element and the polarizing plate. An adhesive layer is optionally provided between layers constituting the liquid crystal display device.

[EXAMPLE A1]

An 80 μm-thick triacetyl cellulose film (FT-UV-80 (trade name) manufactured by Fuju Photo Film Co., Ltd., refractive index 1.49) was prepared as a transparent substrate film. Separately, ultrafine ZnO particles having a refractive index of 1.9 (ZS-300 (trade name) manufactured by Sumitomo Cement Co., Ltd.) and an ionizing radiation curing resin having a refractive index of 1.52 (HN-3 (trade name) manufactured by Mitsubishi Petrochemical Co., Ltd.) were mixed together in a weight ratio of 2:1. The resultant resin composition was coated by gravure reverse coating on the above triacetyl cellulose film to a coating thickness on a dry basis of 7 μm, and the coating was then dried to remove a solvent contained in the coating.

A matte PET film having a fine uneven surface (X-45 (trade name) manufactured by Toray Industries, Inc., thickness 23 μm) was laminated to the triacetyl cellulose film having a dried resin layer so that the resin layer faced the matte PET film. The laminate was then exposed to an electron beam under conditions of 150 kV and 4 Mrad to cure the resin layer, and the matte PET film was peeled off from the laminate, thereby forming a fine uneven surface on the resin layer. Subsequently, $SiO_x$ was vapor-deposited on the fine uneven surface of the resin layer by plasma CVD process to form a 100 nm-thick $SiO_x$ layer (refractive index 1.46), thereby preparing an antiglare-antireflection film of Example 1.

The antiglare-antireflection film had a total light transmittance of 93.5% and a haze value of 9.0, indicating that the film had excellent antireflection and antiglare properties. Further, it had a surface pencil hardness of 3H, i.e., an excellent hard property.

Figure 12:
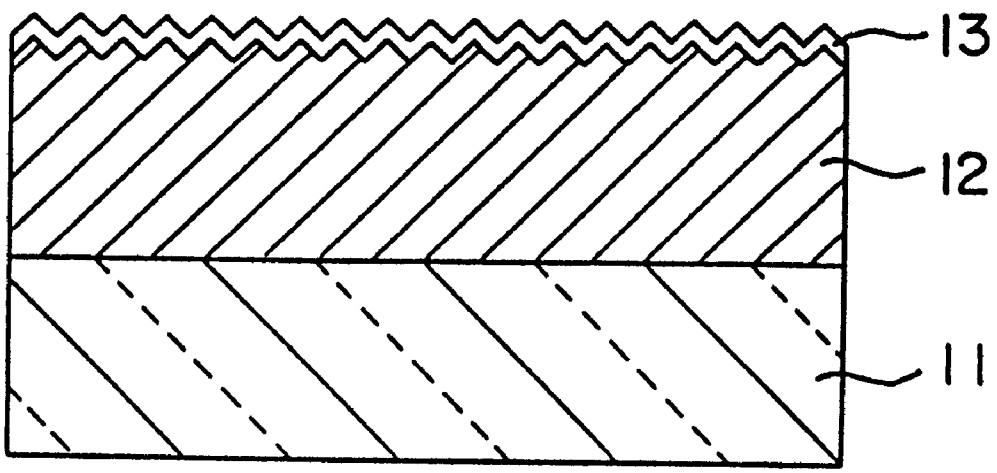
FIG. 12A is a cross-sectional view showing a layer construction of an antiglare-antireflection film prepared in Example A1.
FIG. 12B is a cross-sectional view showing a layer construction of an antireflection film prepared in Example B1.
Figure 12:
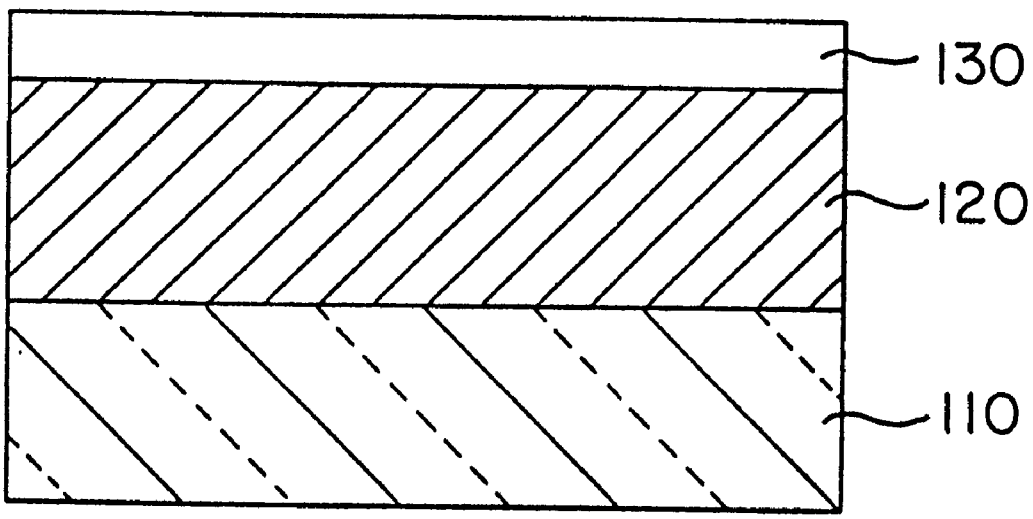

FIG. 12A is a cross-sectional view showing the layer construction of the antiglare-antireflection film prepared in the present example. Numeral 11 designates a transparent substrate film, numeral 12 an antiglare layer having a high refractive index with a hard property being imparted thereto, and numeral 13 a layer having a low refractive index.

[EXAMPLE A2]

An 80 μm-thick triacetyl cellulose film (FT-UV-80 (trade name) manufactured by Fuju Photo Film Co., Ltd., refractive index 1.49) was saponified by immersing the triacetyl cellulose film in a 2 N KOH solution at 60° C. for 1 min, thereby preparing a saponified triacetyl cellulose film which was used as a transparent substrate film (refractive index 1.49). A primer (refractive index 1.55) prepared by adding 10 parts by weight of isocyanate as a curing agent to a vinyl chloride acetate resin (SBP primer G (trade name) manufactured by Dainichiseika Color & Chemicals Manufacturing Co., Ltd.) was coated by gravure reverse coating on the above transparent substrate film to a thickness on a dry basis of 0.7 μm, and the resultant coating was dried at 60° C. for 1 min and then aged at 40° C. for 2 days. A hard coat layer having an uneven surface was formed on the primer layer in the same manner as in Example 1. Further, an $SiO_x$ layer was formed thereon to prepare an antiglare-antireflection film of the present example.

The antiglare-antireflection film had a total light transmittance of 94% and a haze value of 9.0, indicating that the film had excellent antireflection and antiglare properties. Further, it had a surface pencil hardness of 3H, i.e., an excellent hard property.

Figure 13A:
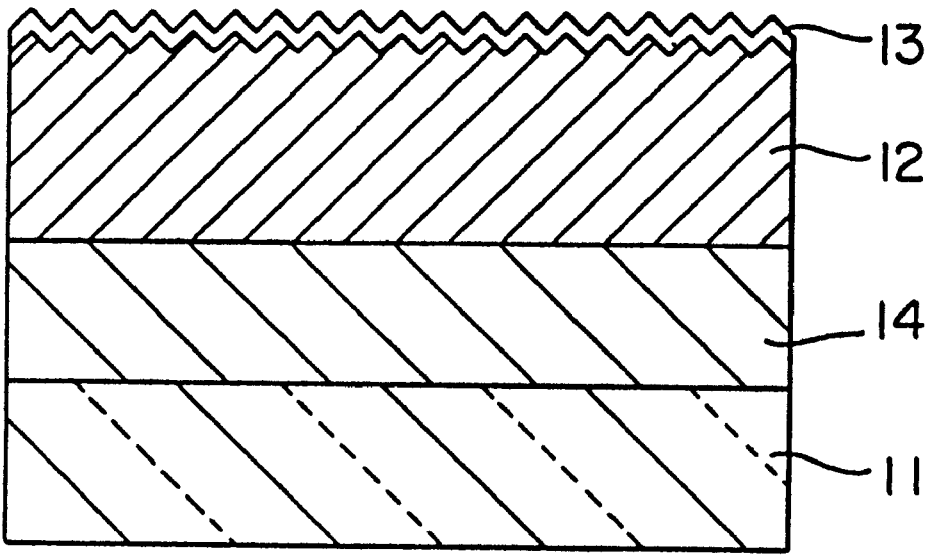
FIG. 13A is a cross-sectional view showing a layer construction of a antiglare-antireflection film prepared in Example A2.

FIG. 13A is a cross-sectional view showing the layer construction of the antiglare-antireflection film prepared in the present example. Numeral 11 designates a transparent substrate film, numeral 14 a primer layer, numeral 12 an antiglare layer having a high refractive index with a hard property being imparted thereto, and numeral 13 a layer having a low refractive index.

[EXAMPLE A3]

A resin composition prepared by mixing ultrafine ZnO particles (ZS-300 (trade name) manufactured by Sumitomo Cement Co., Ltd., refractive index 1.9) and an ionizing radiation curing resin (HN-2 (trade name) manufactured by Mitsubishi Petrochemical Co., Ltd., refractive index 1.54) together in a weight ratio of 2:1 was coated by gravure reverse coating on a matte PET film (X-45 (trade name) manufactured by Toray Industries, Inc., thickness 23 μm) having a fine uneven surface to a coating thickness on a dry basis of 5 μm, and the coating was then exposed to an electron beam under conditions of 150 kV and 3 Mrad, thereby curing the coating.

Separately from the matte PET film with the resin layer being formed thereon, a dry laminate resin prepared by adding 10 parts by weight, based on the adhesive resin, of isocyanate as a curing agent to a urethane adhesive (Takenate A310 (trade name)) was coated on the transparent substrate film used in Example 1 to a coating thickness on a dry basis of 2 μm, and the coating was dried to remove a solvent contained in the coating.

The matte PET film with a resin layer being formed thereon was laminated onto the resultant transparent substrate film with an adhesive layer being formed thereon so that the resin layers faced each other. Thereafter, the laminate was aged at 50° C. for 3 days to completely cure the adhesive layer, and the matte PET film was peeled off. $SiO_x$ was vapor-deposited by the plasma CVD process on the resin layer having a fine uneven surface to a thickness of 100 nm to form an $SiO_x$ layer, thereby preparing an antiglare-antireflection film of the present example.

The antiglare-antireflection film had a total light transmittance of 93.8% and a haze value of 9.0, indicating that the film had excellent antireflection and antiglare properties. Further, it had a surface pencil hardness of 2H, i.e., an excellent hard property.

FIG. 14A is a cross-sectional view showing the layer construction of the antiglare-antireflection-film prepared in the present example. Numeral 11 designates a transparent substrate film, numeral 15 an adhesive layer, numeral 12 an antiglare layer having a high refractive index with a hard property being imparted thereto, and numeral 13 a layer having a low refractive index.

[EXAMPLE A4]

A resin composition prepared by mixing ultrafine ZnO particles (ZS-300 (trade name) manufactured by Sumitomo Cement Co., Ltd., refractive index 1.9) and an ionizing radiation curing resin (HN-2 (trade name) manufactured by Mitsubishi Petrochemical Co., Ltd., refractive index 1.54) together in a weight ratio of 2:1 was coated by gravure reverse coating on a matte PET film having a fine uneven surface (X-45 (trade name) manufactured by Toray Industries, Inc., thickness 23 μm) to a coating thickness on a dry basis of 3 μm, and the coating (resin layer) was then exposed to an electron beam under conditions of 150 kV and 3 Mrad, thereby half-curing the resin layer.

Separately from the matte PET film with the half-cured resin layer being formed thereon, an ionizing radiation curing resin (EXG 40-9 (trade name) manufactured by Dainichiseika Color & Chemicals Manufacturing Co., Ltd., refractive index 1.50) was coated by gravure reverse coating on the triacetyl cellulose film used in Example A1 to a coating thickness on a dry basis of 3 μm, and the coating was dried to remove a solvent contained in the coating. Thereafter, the coated triacetyl cellulose film thus obtained was laminated onto the matte PET film with a half-cured resin layer being formed thereon so that the resin layers faced each other. The laminate was irradiated with an electron beam under conditions of 150 kV and 5 Mrad to completely cure the resin layer, and the matte PET film was peeled off from the laminate. A 100 nm-thick $SiO_x$ layer was formed on the resultant resin layer having a fine uneven surface in the same manner as in Example 1, thereby preparing an antiglare-antireflection film of the present example.

The antiglare-antireflection film had a total light transmittance of 93.5% and a haze value of 9.0, indicating that the film had excellent antireflection and antiglare properties. Further, it had a surface pencil hardness of 3H, i.e., an excellent hard property.

FIG. 15A is a cross-sectional view showing the layer construction of the antiglare-antireflection film prepared in the present example. Numeral 11 designates a transparent substrate film, numeral 16 a clear hard coat layer, numeral 12 an antiglare layer having a high refractive index with a hard property being imparted thereto, and numeral 13 a layer having a low refractive index.

[EXAMPLE A5]

The procedure of Example A2 was repeated to form a primer layer on a saponified triacetyl cellulose film as a transparent substrate film. Then, the procedure of Example A4 was repeated, except that the above film with a primer layer being formed thereon was used, thereby forming on the primer layer a clear hard coat layer, an antiglare layer having a high refractive index with a hard property being imparted thereto, and a layer having a low refractive index. Thus, an antiglare-antireflection film of the present example was prepared.

The antiglare-antireflection film had a total light transmittance of 93.5% and a haze value of 9.0, indicating that the film had excellent antireflection and antiglare properties. Further, it had a surface pencil hardness of 3H, i.e., an excellent hard property.

FIG. 16 is a cross-sectional view showing the layer construction of the antiglare-antireflection film prepared in the present example. Numeral 11 designates a transparent substrate film, numeral 14 a primer layer, numeral 16 a clear hard coat layer, numeral 12 an antiglare layer having a high refractive index with a hard property being imparted thereto, and numeral 13 a layer having a low refractive index.

[EXAMPLE A6]

A resin composition prepared by mixing ultrafine ZnO particles (ZS-300 (trade name) manufactured by Sumitomo Cement Co., Ltd., refractive index 1.9) and an ionizing radiation curing resin of dry to the touch type (H-4000 (trade name) manufactured by Mitsubishi Petrochemical Co., Ltd., refractive index 1.5) together in a weight ratio of 2:1 was coated by gravure reverse coating on a matte PET film having a fine uneven surface (X-45 (trade name) manufactured by Toray Industries, Inc., thickness 23 μm) to a coating thickness on a dry basis of 3 μm, and the coating (resin layer) was then dried at 60° C. for 1 min until it became dry to the touch.

Separately from the matte PET film with a resin layer, which is dry to the touch, being formed thereon, an ionizing radiation curing resin (EXG 40-9 (trade name) manufactured by Dainichiseika Color & Chemicals Manufacturing Co., Ltd., refractive index 1.50) was coated by gravure reverse coating on a triacetyl cellulose film to a thickness on a dry basis of 3 μm, and the coating was then dried to remove a solvent contained in the coating. Thereafter, the matte PET film with a resin layer being formed thereon was laminated onto the resultant triacetyl cellulose film so that the resin layers faced each other. The laminate was then irradiated with an electron beam under conditions of 150 kV and 5 Mrad to completely cure the resin layer, and the matte PET film was peeled off. $SiO_x$ was vapor-deposited on the fine uneven surface in the same manner as in Example 1, thereby forming a 100 nm-thick $SiO_x$ layer. Thus, an antiglare-antireflection film of the present example was prepared.

The antiglare-antireflection film had a total light transmittance of 93.5% and a haze value of 9.0, indicating that the film had excellent antireflection and antiglare properties. Further, it had a surface pencil hardness of 2H, i.e., an excellent hard property.

[EXAMPLE A7]

The procedure of Example A2 was repeated to form a primer layer on a saponified triacetyl cellulose film as a transparent substrate film. Then, the procedure of Example A4 was repeated, except that the above film with a primer layer being formed thereon was used, thereby forming on the primer layer a clear hard coat layer, an antiglare layer having a high refractive index with a hard property being imparted thereto, and a layer having a low refractive index. Thus, an antiglare-antireflection film of Example 7 was prepared.

The antiglare-antireflection film had a total light transmittance of 93.5% and a haze value of 9.0, indicating that the film had excellent antireflection and antiglare properties. Further, it had a surface pencil hardness of 2H, i.e., an excellent hard property.

[EXAMPLE A8]

A 1:10:20 (weight ratio) mixture of polymethyl methacrylate beads having a particle diameter of 5 $\mu$m, an ionizing radiation curing resin (HN-2 (trade name) manufactured by Mitsubishi Petrochemical Co., Ltd., refractive index 1.54), and ultrafine ZnO particles (ZS-300 (trade name) manufactured by Sumitomo Cement Co., Ltd., refractive index of 1.9) was coated by gravure reverse coating on an 80 $\mu$m-thick triacetyl cellulose film (FT-UV-80 (trade name) manufactured by Fuju Photo Film Co., Ltd.) to a thickness on a dry basis of 6 $\mu$m, and the coating was then irradiated with an electron beam under conditions of 150 kV and 4 Mrad. The surface of the cured coating formed on the triacetyl cellulose film was finely uneven due to fine beads of polymethyl methacrylate. Subsequently, $SiO_x$ was vapor-deposited on the cured coating in the same manner as in Example A1 to form a 100 nm-thick $SiO_x$ layer, thereby preparing an antiglare-antireflection film of the present example.

The antiglare-antireflection film had a total light transmittance of 94% and a haze value of 5.0, indicating that the film had excellent antireflection and antiglare properties. Further, it had a surface pencil hardness of 3H, i.e., an excellent hard property.

FIG. 17 is a cross-sectional view showing the layer construction of the antiglare-antireflection film prepared in the present example. Numeral 11 designates a transparent substrate film, numeral 17 an antiglare layer having a high refractive index, the antiglare layer 17 containing a matte material 18 and having a hard property imparted thereto, and numeral 13 a layer having a low refractive index.

[EXAMPLE A9]

The procedure of Example A2 was repeated to form a primer layer on a saponified triacetyl cellulose film as a transparent substrate film. Then, the procedure of Example A8 was repeated, except that the above film with a primer layer being formed thereon was used, thereby forming on the primer layer an antiglare layer having a high refractive index with a hard property being imparted thereto and a layer having a low refractive index. Thus, an antiglare-antireflection film of the present example was prepared.

The antiglare-antireflection film had a total light transmittance of 94% and a haze value of 5.0, indicating that the film had excellent antireflection and antiglare properties. Further, it had a surface pencil hardness of 3H, i.e., an excellent hard property.

FIG. 18 is a cross-sectional view showing the layer construction of the antiglare-antireflection film prepared in the present example. Numeral 11 designates a transparent substrate film, numeral 14 a primer layer, numeral 17 an antiglare layer having a high refractive index, the antiglare layer 17 containing a matte material 19 and having a hard property imparted thereto, and numeral 13 a layer having a low refractive index.

[EXAMPLE A10]

A resin composition prepared by mixing ultrafine ZnO particles (ZS-300 (trade name) manufactured by Sumitomo Cement Co., Ltd., refractive index 1.9) and an electron beam curing resin (HN-3 (trade name) manufactured by Mitsubishi Petrochemical Co., Ltd.) together in a weight ratio of 2:1 was coated by gravure reverse coating on a PET film (T-600 (trade name) manufactured by Diafoil Co., Ltd., thickness 50 $\mu$m) having a fine uneven surface to a coating thickness on a dry basis of 7 $\mu$m, and the coating was then exposed to an electron beam under conditions of an accelerating voltage of 175 kV and 4 Mrad to cure the coating, thereby forming an antiglare layer having a high refractive index with a hard property imparted thereto.

An adhesive (Takelac (trade name) manufactured by Takeda Chemical Industries, Ltd.) was coated by gravure reverse coating on the antiglare layer having a high refractive index of the PET film to form an adhesive layer. Subsequently, a triacetyl cellulose film (FT-UV-80 (trade name) manufactured by Fuji Photo Film Co., Ltd., thickness 80 $\mu$m) was laminated to the PET film through the adhesive layer to prepare a laminate. The laminate was then aged at 40° C. for 3 days, and the PET film was peeled off from the laminate, thereby transferring the antiglare layer having a high refractive index onto the triacetyl cellulose film. The surface of the antiglare layer having a high refractive index on the triacetyl cellulose film was finely uneven as in the surface of the PET film. Further, $SiO_x$ was then vapor-deposited on the antiglare layer having a high refractive index by the plasma CVD process to form a 100 nm-thick plasma CVD layer having a low refractive index, thereby preparing an antiglare-antireflection film of the present example.

The antiglare-antireflection film of the present invention had a total light transmittance of 94.5% and a haze value of 0.7, indicating that the film had excellent antireflection properties. Further, it had a surface pencil hardness of 3H, i.e., an excellent hard property.

[Comparative Example A]

An 80 $\mu$m-thick triacetyl cellulose film (FT-UV-80 (trade name) manufactured by Fuju Photo Film Co., Ltd.) was provided as a substrate. An ionizing radiation curing resin (EXG 40-9 (trade name) manufactured by Dainichiseika Color & Chemicals Manufacturing Co., Ltd., refractive index 1.50) was coated by gravure reverse coating on the film to a coating thickness on a. dry basis of 7 $\mu$m, and the coating was dried to remove a solvent contained therein. Thereafter, the matte PET film having a fine uneven surface (X-45 (trade name) manufactured by Toray Industries, Inc., thickness 23 $\mu$m) was laminated onto the dried resin. The laminate was irradiated with an electron beam under conditions of 150 kV and 4 Mrad to cure the resin layer, and the matte PET film was then peeled off from the laminate. $SiO_x$ was vapor-deposited on the resin layer having a fine uneven surface to form a 100 nm-thick $SiO_x$ film.

The film of the comparative example had a total light transmittance of 91.8% and a haze value of 9.0, indicating that the comparative film had a lower antireflection property than the films of the above examples of the present invention. The surface pencil hardness of the comparative film was 2H.

[EXAMPLE A11]

The following samples were prepared.

| Sample | Contact angle (°) | Coefficient of friction | Refractive index | Starting material |
|---|---|---|---|---|
| (Film formation by batch plasma deposition) | | | | |
| $SiO_x$/HC/TAC(1) | 50 | 1.10 | 1.42 | $HMDSO + O_2$ |
| $SiO_x$/HC/TAC(2) | 104 | 0.44 | 1.44 | $HMDSO + O_2$ |
| $SiO_x$/HC/TAC(3) | 155 | 0.40 | 1.60 | $HMDSO + O_2$ |

A 2:1 (solid matter weight ratio) mixture of a ZnO coating solution (ZS-300 manufactured by Sumitomo Cement Co., Ltd.) and a hard coat resin (40-9 manufactured by Dainichiseika Color & Chemicals Manufacturing Co., Ltd.) was diluted with a solution of methyl ethyl ketone:toluene=1:1 to a solid content of 30% by weight, and the diluted solution was coated by means of a wire bar on a release film having a surface treated with an acryl-melamine resin (MC-19 manufactured by Reiko Co., Ltd.) to a coating thickness on a dry basis of about 6 μm. The resultant coating was dried and cured by EB. Further, an adhesive (main agent: a 6:1 mixture of Takelac A-310 manufactured by Takeda Chemical Industries, Ltd. and Takenate A-3 as a curing agent manufacture by Takeda Chemical Industries, Ltd.) was coated thereon to a coating thickness on a dry basis of 4 μm. Then, the coated release film and the substrate TAC film used in the final product were laminated on top of the other, and the laminate was cured by aging at 40° C. for 2 days. Thereafter, the release film was peeled off, and CVD of $SiO_x$ was carried out under the following conditions to prepare an antireflection film.

| Batch plasma CVD apparatus | Film forming conditions (1) |
|---|---|
| Degree of vacuum: | 0.45 torr |
| Power (frequency): | 100 W (13.56 MHz) |
| Ratio of ingredients constituting process gas: | $He:O_2$:monomer = 100:100:1 |
| Flow rate of process gas: | He + monomer, 25 sccm, $O_2$, 25 sccm |

| Batch plasma CVD apparatus | Film forming conditions (2) |
|---|---|
| Degree of vacuum: | 0.45 torr |
| Power (frequency): | 100 W (13.56 MHz) |
| Ratio of ingredients constituting process gas: | $He:O_2$:monomer = 100:100:4.6 |
| Flow rate of process gas: | He + monomer, 25 sccm, $O_2$, 25 sccm |

| Batch plasma CVD apparatus | Film forming conditions (3) |
|---|---|
| Degree of vacuum: | 0.45 torr |
| Power (frequency): | 100 W (13.56 MHz) |
| Ratio of ingredients constituting process gas: | $He:O_2$:monomer = 100:100:10 |
| Flow rate of process gas: | He + monomer, 25 sccm, $O_2$, 25 sccm |
| Vapor-depositing machine: | A handmade device using components manufactured by Anelva Engineering Corporation and other components |
| Vapor-depositing substance: | HMDSO (hexamethyldisiloxane) as monomer + $O_2$ (Samples (1), (2), and (3) were prepared by varying $HMDSO:O_2$) |
| Carrier gas: | He |
| Substrate temp.: | Room temperature |
| Vapor deposition rate: | 1.3 Å/S |
| Film thickness: | 1000 Å |

[EXAMPLE A12]

The following samples were prepared.

| Sample | Contact angle (°) | Coefficient of friction | Refractive index | Starting material |
|---|---|---|---|---|
| (Film formation by continuous plasma CVD) | | | | |
| $SiO_x$/HC/TAC(1) | 83 | 0.90 | 1.42 | $HMDSO + O_2$ |
| $SiO_x$/HC/TAC(2) | 102 | 0.47 | 1.44 | $HMDSO + O_2$ |
| $SiO_x$/HC/TAC(3) | 162 | 0.40 | 1.50 | $HMDSO + O_2$ |
| (Film formation by continuous plasma CVD followed by corona treatment of the film on its surface) | | | | |
| $SiO_x$/HC/TAC(2) | 55 | 0.92 | 1.44 | $HMDSO + O_2$ |

A 2:1 (solid matter weight ratio) mixture of a ZnO coating solution (ZS-300 manufactured by Sumitomo Cement Co., Ltd.) and a hard coat resin (40-9 manufactured by Dainichiseika Color & Chemicals Manufacturing Co., Ltd.) was diluted with a solution of methyl ethyl ketone:toluene=1:1 to a solid content of 30% by weight, and the diluted solution was coated by means of a wire bar on a 25 μm-thick matte PET film having a fine uneven surface (Emblet PTH manufactured by Unitika Ltd.) to a coating thickness on a dry basis of about 6 μm. The resultant coating was dried and cured by EB. Further, an adhesive (main agent: a 6:1 mixture of Takelac A-310 manufactured by Takeda Chemical Industries, Ltd. and Takenate A-3 as a curing agent manufacture by Takeda Chemical Industries, Ltd.) was coated thereon to a coating thickness on a dry basis of 4 μm. Then, the coated release film and the substrate TAC film used in the final product were laminated on top of the other, and the laminate was cured by aging at 40° C. for 2 days. Thereafter, the matted PET film was peeled off, and plasma CVD of $SiO_x$ was carried out under the following varied HMDSO (monomer): $O_2$ conditions to prepare antireflection films. For the conditions (2), the corona discharge treatment to impart hydrophilicity resulted in reduced contact angle of the resultant film with water and increased coefficient of friction.

| Continuous plasma CVD apparatus | Film forming conditions (1) |
|---|---|
| Degree of vacuum | $5 \times 10^{-2}$ torr |
| Power (frequency) | 30 kW (40 kHz) |
| Ratio of ingredients constituting process gas | $He:O_2$:monomer = 16:90:1 |
| Machine speed | 10 m/min |

-continued

| Continuous plasma CVD apparatus | Film forming conditions (2) |
|---|---|
| Degree of vacuum | $5 \times 10^{-2}$ torr |
| Power (frequency) | 30 kW (40 kHz) |
| Ratio of ingredients constituting process gas | He:$O_2$:monomer = 16:16:1 |
| Machine speed | 10 m/min |

| Continuous plasma CVD apparatus | Film forming conditions (3) |
|---|---|
| Degree of vacuum | $5 \times 10^{-2}$ torr |
| Power (frequency) | 30 kW (40 kHz) |
| Ratio of ingredients constituting process gas | He:$O_2$:monomer = 16:6:1 |
| Machine speed | 10 m/min |

[Reference Example A1]

The following samples were prepared.

| Sample | Contact angle (°) | Coefficient of friction | Refractive index | Starting material |
|---|---|---|---|---|
| (Film formation by batch plasma CVD) | | | | |
| $SiO_x$/HC/TAC | 43.9 | 1.13 | 1.44 | $SiH_4$ |

A 2:1 (solid matter weight ratio) mixture of a ZnO coating solution (ZS-300 manufactured by Sumitomo Cement Co., Ltd.) and a hard coat resin (C-19 manufactured by Dainichiseika Color & Chemicals Manufacturing Co., Ltd.) was diluted with a solution of methyl ethyl ketone:toluene=1:1 to a solid content of 30% by weight, and the diluted solution was coated by means of a wire bar on a release film having a surface treated with an acryl-melamine resin (MC-19 manufactured by Reiko Co., Ltd.) to a coating thickness on a dry basis of about 6 μm. The resultant coating was dried and cured by EB. Further, an adhesive (main agent: a 6:1 mixture of Takelac A-310 manufactured by Takeda Chemical Industries, Ltd. and Takenate A-3 as a curing agent manufacture by Takeda Chemical Industries, Ltd.) was coated thereon to a coating thickness on a dry basis of 4 μm. Then, the coated release film and the substrate TAC film used in the final product were laminated on top of the other, and the laminate was cured by aging at 40° C. for 2 days. Thereafter, the release film was peeled off, and CVD of $SiO_x$ was carried out under the following conditions to prepare an antireflection film.

| Batch plasma CVD apparatus | Film forming condition |
|---|---|
| Degree of vacuum: | 0.45 torr |
| Power (frequency): | 100 W (13.56 MHz) |
| Ratio of ingredients constituting process gas: | He:$O_2$:$SiH_4$ = 100:100:4.6 |
| Flowrate of process gas: | He + $SiH_4$, 25 sccm, $O_2$, 25 sccm |
| Vapor-depositing machine: | A handmade device using components manufactured by Anelva Engineering Corporation and other components |
| Vapor-depositing substance: | $SiH_4$ + $O_2$ |
| Carrier gas: | He |
| Substrate temp.: | Room temperature |

-continued

| Batch plasma CVD apparatus | Film forming condition |
|---|---|
| Vapor deposition rate: | 1.3 Å/S |
| Film thickness: | 1000 Å |

[Reference Example A2]

The following samples were prepared.

| Sample | Contact angle (°) | Coefficient of friction | Refractive index | Starting material |
|---|---|---|---|---|
| (Film formation by vacuum deposition) | | | | |
| $SiO_2$/HC/TAC | 32 | 1.50 | 1.44 | $SiO_2$ |

A 2:1 (solid matter weight ratio) mixture of a ZnO coating solution (ZS-300 manufactured by Sumitomo Cement Co., Ltd.) and a hard coat resin (40-9 manufactured by Dainichiseika Color & Chemicals Manufacturing Co., Ltd.) was diluted with a solution of methyl ethyl ketone:toluene=1:1 to a solid content of 30% by weight, and the diluted solution was coated by means of a wire bar on a release film having a surface treated with an acryl-melamine resin (MC-19 manufactured by Reiko Co., Ltd.) to a coating thickness on a dry basis of about 6 μm. The resultant coating was dried and cured by EB. Further, an adhesive (main agent: a 6:1 mixture of Takelac A-310 manufactured by Takeda Chemical Industries, Ltd. and Takenate A-3 as a curing agent manufacture by Takeda Chemical Industries, Ltd.) was coated thereon to a coating thickness on a dry basis of 4 μm. Then, the coated release film and the substrate TAC film used in the final product were laminated on top of the other, and the laminate was cured by aging at 40° C. for 2 days. Thereafter, the release film was peeled off, and vapor-deposition of $SiO_2$ was carried out under the following conditions to prepare an antireflection film.

Vapor-depositing machine: Synchron BMC-700

Vapor-depositing substance: $SiO_2$

Degree of vacuum: $4 \times 10^{-2}$ torr

Substrate temp.: Room temperature

Vapor-deposition: EB heating

Accelerating voltage: 8 kV

Emission: 40 mA

Vapor deposition rate: 4 Å/S

Film thickness: 1000 Å

[Reference Example A3]

The following samples were prepared.

| Sample | Contact angle (°) | Coefficient of friction | Refractive index | Starting material |
|---|---|---|---|---|
| (Film formation by vacuum deposition) | | | | |
| $SiO_x$/HC/TAC | 11.2 | 1.12 | 1.50 | SiO |
| $SiO_x$/HC/TAC | 12.3 | 1.89 | 1.50 | SiO |

A 2:1 (solid matter weight ratio) mixture of a ZnO coating solution (ZS-300 manufactured by Sumitomo Cement Co., Ltd.) and a hard coat resin (40-9 manufactured by Dainichiseika Color & Chemicals Manufacturing Co., Ltd.) was diluted with a solution of methyl ethyl ketone:toluene=1:1 to a solid content of 30% by weight, and the diluted solution was coated by means of a wire bar on a release film having a surface treated with an acryl-melamine resin (MC-19 manufactured by Reiko Co., Ltd.) to a coating thickness on a dry basis of about 6 μm. The resultant coating was dried and cured by EB. Further, an adhesive (main agent: a 6:1 mixture of Takelac A-310 manufactured by Takeda Chemical Industries, Ltd. and Takenate A-3 as a curing agent manufacture by Takeda Chemical Industries, Ltd.) was coated thereon to a coating thickness on a dry basis of 4 μm. Then, the coated release film and the substrate TAC film used in the final product were laminated on top of the other, and the laminate was cured by aging at 40° C. for 2 days. Thereafter, the release film was peeled off, and vapor-deposition of SiO was carried out under the following conditions to prepare an antireflection film.

Vapor-depositing machine: Synchron BMC-700

Vapor-depositing substance: SiO

Degree of vacuum: $4 \times 10^{-2}$ torr

Substrate temp.: Room temperature

Vapor-deposition: EB heating

Accelerating voltage: 5 kV

Emission: 40 mA

Vapor deposition rate: 4 Å/S

Film thickness: 1000 Å

Since the optical functional membrane and the optical functional film of the present invention comprise a particular film of $SiO_x$ wherein x is $1.50 \leq x \leq 4.00$, they have excellent moistureproofness and anitfouling property, good film hardness, excellent adhesion to a resin layer, and can reduce heat damage to the transparent substrate film at the time of forming the $SiO_x$ film as compared with the case where the film is formed by the vapor phase growth process.

According to the antiglare-antireflection film of the present invention, a layer having a low refractive index, which is lower than the refractive index of the antiglare layer, is formed on the antiglare layer, and the refractive index of the antiglare layer is higher than that of a layer in contact with the antiglare layer in its surface remote from the layer having a low refractive index, enabling the reflection of light at the interface of the antiglare layer and the layer in contact with the antiglare layer in its surface remote from the layer having a low refractive index to be reduced. Therefore, the antiglare-antireflection film of the present invention is excellent in the antiglare property as well as in the antireflection effect.

The use of functional fine particles as fine particles having a high refractive index, for example, ZnO or $TiO_2$, in the antiglare layer of the antiglare-antireflection film of the present invention can impart, besides the antiglare-antireflection properties, other various functions, for example, UV shielding effect.

[EXAMPLE B1]

An 80 μm-thick triacetyl cellulose film (FT-UV-80 (trade name) manufactured by Fuju Photo Film Co., Ltd., refractive index 1.49) was prepared as a transparent substrate film. Separately, ultrafine ZnO particles (ZS-300 (trade name) manufactured by Sumitomo Cement Co., Ltd., refractive index 1.9) and an ionizing radiation curing resin (HN-2 (trade name) manufactured by Mitsubishi Petrochemical Co., Ltd., refractive index 1.54) were mixed together in a weight ratio of 2:1. The resultant resin composition was coated by gravure reverse coating on the above triacetyl cellulose film to a coating thickness on a dry basis of 7 μm, and the coating was then irradiated with an electron beam under conditions of 150 kV and 3 Mrad to cure the coating, thereby preparing a hard coat layer having a high refractive index.

Then, $SiO_x$ (refractive index 1.46) was vapor-deposited on the above hard coat layer by the plasma CVD process to form a 100 nm-thick $SiO_x$ film as a layer having a low refractive index.

The antireflection film of Example 1 had a total light transmittance of 94.2% and a haze value of 1.0, indicating that the film had excellent antireflection properties. Further, it had a surface pencil hardness of 3H, i.e., an excellent hard property.

FIG. 12B is a cross-sectional view showing the layer construction of the antireflection film prepared in the present example 1. Numeral 110 designates a transparent substrate film, numeral 120 a hard coat layer having a high refractive index, and numeral 130 a layer having a low refractive index.

[EXAMPLE B2]

An 80 μm-thick triacetyl cellulose film (FT-UV-80 (trade name) manufactured by Fuju Photo Film Co., Ltd.) was saponified by immersing the triacetyl cellulose film in a 2 N KOH solution at 60° C. for 1 min, thereby preparing a saponified triacetyl cellulose film which was used as a transparent substrate film (refractive index 1.49). Separately, primer (refractive index 1.55) prepared by adding 10 parts by weight of isocyanate as a curing agent to a vinyl chloride acetate resin (SBP primer G (trade name) manufactured by Dainichiseika Color & Chemicals Manufacturing Co., Ltd.) was coated by gravure reverse coating on the above transparent substrate film to a thickness on a dry basis of 0.7 μm, and the resultant coating was dried at 60° C. for 1 min and then aged at 40° C. for 2 days. A hard coat layer having a high refractive index and a layer having a low refractive index were formed on the resultant film in the same manner as in Example B1.

The antireflection film of the present example thus formed had a total light transmittance of 94.5% and a haze value of 1.0, indicating that the film had excellent antireflection properties. Further, it had a surface pencil hardness of 3H, i.e., an excellent hard property.

Figure 13B:
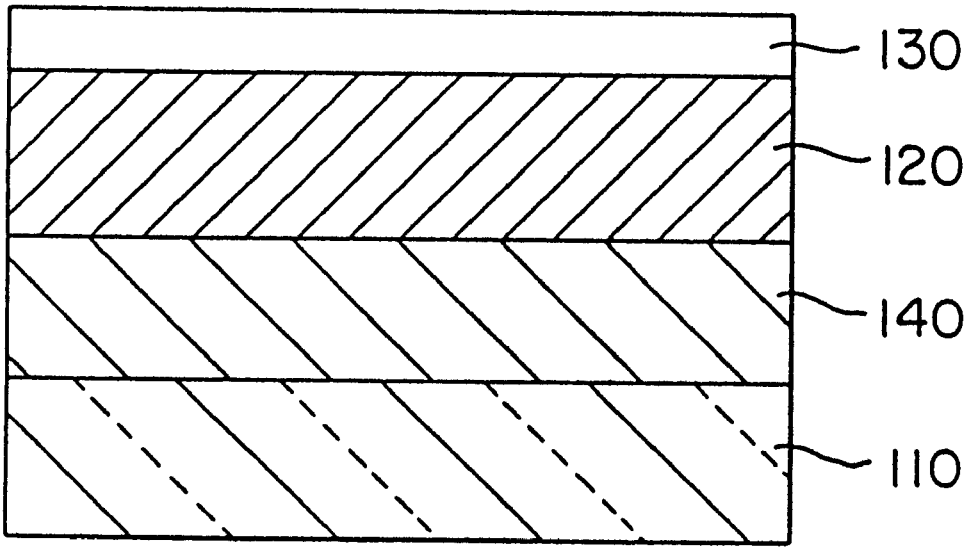
FIG. 13B is a cross-sectional view showing a layer construction of an antireflection film prepared in Example B2.

FIG. 13B is a cross-sectional view showing the layer construction of the antireflection film prepared in the present example. Numeral 110 designates a transparent substrate film, numeral 140 a primer layer, numeral 120 a hard coat layer having a high refractive index, and numeral 130 a layer having a low refractive index.

[EXAMPLE B3]

An antireflection film was prepared in the same manner as in Example B2, except that, instead of the $SiO_x$ film by the plasma CVD process, a layer formed by coating an ionizing radiation curing resin containing 10% by weight of ultrafine particles of magnesium fluoride (refractive index 1.4)(DT-1 (trade name) manufactured by Sumitomo Cement Co., Ltd., refractive index 1.42) by gravure reverse coating to a coating thickness on a dry basis of 100 nm and irradiating the resultant coating with an electron beam under conditions of 150 kV and 2 Mrad to cure the coating was used as the layer having a low refractive index. The coating had a refractive index of 1.42.

The antireflection film of the present example thus prepared had a total light transmittance of 94.7% and a haze value of 1.0, indicating that the film had excellent antireflection properties. Further, it had a surface pencil hardness of H, i.e., an excellent hard property.

[EXAMPLE B4]

An antireflection film was prepared in the same manner as in Example B2, except that the formation of a hard coat layer having a high refractive index and a layer having a low refractive index was varied as follows. Specifically, a primer layer was formed on a saponified triacetyl cellulose film, and a resin composition prepared by mixing ultrafine particles of ZnO (ZS-300 (trade name) manufactured by Sumitomo Cement Co., Ltd., refractive index 1.9) and an ionizing radiation curing resin (EXG 40-9: (trade name) manufactured by Dainichiseika Color & Chemicals Manufacturing Co., Ltd., refractive index 1.49) together in a weight ratio of 2:1 was coated by gravure reverse coating to a coating thickness on a dry basis of 7 μm, and the coating was irradiated with an electron beam under conditions of 150 kV and 3 Mrad to cure the coating. A 100 nm-thick $SiO_x$ film was formed thereon in the same manner as in Example B1.

The antireflection film of the present example thus prepared had a total light transmittance of 93.8% and a haze value of 1.0, indicating that the film had excellent antireflection properties. Further, it had a surface pencil hardness of 3H, i.e., an excellent hard property.

[EXAMPLE B5]

A resin composition prepared by mixing an electron beam curing resin (HN-3 (trade name) manufactured by Mitsubishi Petrochemical Co., Ltd.) and ultrafine particles of ZnO (ZS-300 (trade name) manufactured by Sumitomo Cement Co., Ltd., refractive index 1.9) together in a weight ratio of 2:1 was coated by gravure reverse coating on a PET film having a smooth surface (T-600 (trade name) manufactured by Diafoil Co., Ltd., thickness 50 μm) to a coating thickness on a dry basis of 7 μm, and the coating was then irradiated with an electron beam under conditions of an accelerating voltage of 175 kV and 4 Mrad, thereby curing the coating to prepare a hard coat layer having a high refractive index. An adhesive (Takelac (trade name) manufactured by Takeda Chemical Industries, Ltd.) was coated by gravure reverse coating on the resultant hard coat layer having a high refractive index of the PET film to prepare an adhesive layer. Subsequently, a triacetyl cellulose film (FT-UV-80 (trade name) manufactured by Fuji Photo Film Co., Ltd., thickness 80 μm) was laminated to the PET film through the adhesive layer to prepare a laminate. The laminate was then aged at 40° C. for 3 days, and the PET film was peeled off from the laminate, thereby transferring the hard coat layer having a high refractive index to the triacetyl cellulose film. Further, $SiO_x$ was vapor-deposited on the hard coat layer having a high refractive index of the triacetyl cellulose film by the plasma CVD process to form a 100 nm-thick plasma CVD layer having a low refractive index, thereby preparing an antireflection film of the present example.

The antireflection film of the present example thus prepared had a total light transmittance of 94.5% and a haze value of 0.7, indicating that the film had excellent antireflection properties. Further, it had a surface pencil hardness of 3H, i.e., an excellent hard property.

[Comparative Example B1]

An ionizing radiation curing resin (EXG 40-9: (trade name) manufactured by Dainichiseika Color & Chemicals Manufacturing Co., Ltd., refractive index 1.49) was coated by gravure reverse coating on an 80 μm-thick triacetyl cellulose film (FT-UV-80 (trade name) manufactured by Fuju Photo Film Co., Ltd., refractive index 1.49) as a transparent substrate film to a coating thickness on a dry basis of 7 μm, and the coating was irradiated with an electron beam under conditions of 150 kV and 3 Mrad to cure the coating. $SiO_x$ was vapor-deposited by the plasma CVD process on the cured coating in the same manner as in Example B1, thereby forming a 100 nm-thick $SiO_x$ layer.

The film of Comparative Example B1 thus prepared had a total light transmittance of 92.7% and a haze value of 1.0, indicating that the film had lower antireflection properties than the films of the examples of the present invention. Further, it had a surface pencil hardness of 2H.

[Comparative Example B2]

An ionizing radiation curing resin (EXG 40-9: (trade name) manufactured by Dainichiseika Color & Chemicals Manufacturing Co., Ltd., refractive index 1.49) was coated by gravure reverse coating on an 80 μm-thick triacetyl cellulose film (FT-UV-80 (trade name) manufactured by Fuju Photo Film Co., Ltd., refractive index 1.49) as a transparent substrate film to a coating thickness on a dry basis of 0.3 μm, and the coating was irradiated with an electron beam under conditions of 150 kV and 3 Mrad to cure the coating. $SiO_x$ was vapor-deposited by the plasma CVD process on the cured coating in the same manner as in Example B1, thereby forming a 100 nm-thick $SiO_x$ layer. The antireflection film of Comparative Example B2 thus prepared had a total light transmittance of 92.7% and a haze value of 1.0, indicating that the film had lower antireflection properties than the films of the examples of the present invention. Further, it had a surface pencil hardness of B.

According to the antireflection film of the present invention, a layer having a low refractive index is formed on a hard coat layer, and the refractive index of the hard coat layer is higher than that of a layer in contact with the hard coat layer in its surface remote from the layer having a low refractive index. By virtue of this constitution, the antireflection film of the present invention has an antireflection property and, at the same time, a hard property and, further, can reduce the reflection of light in the interface of the hard coat layer and the layer in contact with the hard coat layer. Therefore, the provision of the antireflection film of the present invention to, for example, a polarizing plate or a liquid crystal display device, by means of lamination or application can impart the above effect of the antireflection film to the a polarizing plate or a liquid crystal display device.

In the antireflection film of the present invention, when an $SiO_x$ film formed by the plasma CVD process is used as the layer having a low refractive index, the antireflection film has excellent moistureproofness, gas barrier property, transparency, scratch resistance, and adhesion in addition to the above effects.

What is claimed is:

1. An antiglare-antireflection film comprising:
    a transparent substrate film and a layer system on a surface thereof, the layer system comprising an antiglare layer having a fine uneven surface, and
    a low refractive index layer, provided on said layer system, the refractive index of the low refractive index layer being lower than that of said antiglare layer, the low refractive index layer comprising an $SiO_x$ film containing undecomposed organosiloxane, wherein x is $1.50 \leq x \leq 4.00$, the surface of said $SiO_x$ film having a contact angle with water of 40° to 180°, and said $SiO_x$ film having a refractive index of 1.35 to 1.48, the refractive index of said antiglare layer being higher than that of any layer in contact with said antiglare layer on its surface remote from said low refractive index layer.

2. The antiglare-antireflection film according to claim 1, wherein said antiglare layer comprises a coating having a thickness of not less than 0.5 μm.

3. The antiglare-antireflection film according to claim 1, wherein said antiglare layer is composed mainly of a binder resin.

4. The antiglare-antireflection film according to claim 3, wherein said binder resin constituting said antiglare layer is at least one of a thermosetting resin and an ionizing radiation curing resin.

5. The antiglare-antireflection film according to claim 3, wherein said antiglare layer comprises a binder resin and fine particles having a high refractive index of not less than 1.50.

6. The antiglare-antireflection film according to claim 5, wherein said fine particles having a high refractive index are selected from $ZrO_2$, ZnO, $TiO_2$, $Sb_2O_5$, $SnO_2$, ITO, and $CeO_2$.

7. The antiglare-antireflection film according to claim 1, wherein said antiglare layer has a hard property.

8. The antiglare-antireflection film according to claim 1, wherein the fine uneven surface of the said antiglare layer is formed by using an embossing film.

9. The antiglare-antireflection film according to claim 1, wherein the fine uneven surface of the said antiglare layer is formed by using a matte material.

10. The antiglare-antireflection film according to claim 1, wherein said other layers are at least one of an adhesive layer, a primer layer and a hard coat layer.

11. The antiglare-antireflection film according to claim 1, wherein the antiglare layer is provided directly on a surface of the transparent substrate film.

12. The antiglare-antireflection film according to claim 1, wherein the antiglare layer is provided on the transparent substrate film through other layer(s).

13. An antireflection film comprising:

a transparent substrate film and, provided through other layer(s) on at least one surface of said transparent substrate film, a low refractive index layer as a surface layer, the low refractive index layer comprising an $SiO_x$ film containing undecomposed organosiloxane, wherein x is $1.50 \leq x \leq 4.00$, the surface of said $SiO_x$ film having a contact angle with water of 40° to 180°, and said $SiO_x$ film having a refractive index of 1.35 to 1.48; and at least one layer of said other layer(s) being a hard coat layer composed mainly of a binder resin, said hard coat layer being in direct contact with said low refractive index layer, the refractive index of said hard coat layer being higher than that of a layer in contact with said hard coat layer on its surface remote from said low refractive index layer.

14. The antireflection film according to claim 13, wherein said hard coat layer has a thickness of not less than 0.5 μm.

15. The antireflection film according to claim 13, wherein said hard coat layer comprises a binder resin and fine particles having a high refractive index of not less than 1.5 which is higher than the refractive index of said binder resin.

16. The antireflection film according to claim 15, wherein said fine particles having a high refractive index are at least one member selected from $ZrO_2$, ZnO, $TiO_2$, $Sb_2O_5$, $SnO_2$, ITO, and $CeO_2$.

17. The antireflection film according to claim 13, wherein said binder resin has, as its constituent molecule or atom, at least one molecule and/or atom selected from (1) an aromatic ring, (2) halogen atoms except for F, and (3) S, N, and P atoms.

18. The antireflection film according to claim 13, wherein said binder resin comprises at least one of a thermosetting resin and an ionizing radiation curing resin.

19. The antireflection film according to claim 13, wherein said other layer is at least one of an adhesive layer, a primer layer, and a hard coat layer.

* * * * *